United States Patent
Rinko et al.

(10) Patent No.: US 11,733,447 B2
(45) Date of Patent: Aug. 22, 2023

(54) OPTICAL DEVICE

(71) Applicant: NITTO DENKO CORPORATION, Osaka (JP)

(72) Inventors: Kari Rinko, Helsinki (FI); Shingo Matsumoto, Tokyo (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/982,293

(22) PCT Filed: Mar. 22, 2019

(86) PCT No.: PCT/IB2019/052345
§ 371 (c)(1),
(2) Date: Sep. 18, 2020

(87) PCT Pub. No.: WO2019/180676
PCT Pub. Date: Sep. 26, 2019

(65) Prior Publication Data
US 2021/0026086 A1 Jan. 28, 2021

Related U.S. Application Data

(60) Provisional application No. 62/646,461, filed on Mar. 22, 2018.

(51) Int. Cl.
*G02B 6/36* (2006.01)
*F21V 8/00* (2006.01)
(Continued)

(52) U.S. Cl.
CPC ......... *G02B 6/0036* (2013.01); *G02B 5/0247* (2013.01); *G02B 6/0023* (2013.01);
(Continued)

(58) Field of Classification Search
CPC ..................... G02B 6/0038; G02B 6/12002
See application file for complete search history.

(56) References Cited

U.S. PATENT DOCUMENTS 8,498,505 B2 * 7/2013 Moore ................ H01L 31/0543
385/33
9,246,038 B2 * 1/2016 Moore ................ H01L 31/0547
(Continued)

FOREIGN PATENT DOCUMENTS

| EP | 1988333 | 11/2008 |
| JP | 2009-276713 A | 11/2009 |
| JP | 2015-213051 A | 11/2015 |

OTHER PUBLICATIONS

Extended European Search Report received in EP Application No. 19771669.9, dated Dec. 2, 2021.
(Continued)

*Primary Examiner* — Eric Wong
(74) *Attorney, Agent, or Firm* — Greenblum & Bernstein, P.L.C.

(57) ABSTRACT

A transparent optical device (100) is provided, comprising a lightguide medium (101) configured for light propagation, and an at least one optically functional layer (10) comprising at least one optically functional feature pattern (11) formed in a light-transmitting carrier medium (11 1) by a plurality of embedded features provided as optically functional internal cavities (12), wherein said at least one feature pattern (11) is configured to perform an incident light control function and at least a light outcoupling function, whereby stray light is minimized and optical transparency of the device (100) is established.

38 Claims, 18 Drawing Sheets

(51) Int. Cl.
  *G02B 5/02* (2006.01)
  *G09F 13/18* (2006.01)
  *G02B 6/42* (2006.01)

(52) U.S. Cl.
  CPC ......... *G02B 6/0031* (2013.01); *G02B 6/0043* (2013.01); *G02B 6/0055* (2013.01); *G02B 6/0063* (2013.01); *G02B 6/002* (2013.01); *G02B 6/4243* (2013.01); *G02B 6/4259* (2013.01); *G09F 2013/1804* (2013.01)

(56) References Cited

U.S. PATENT DOCUMENTS

| | | | | |
|---|---|---|---|---|
| 9,568,662 | B2* | 2/2017 | Lim | G02B 6/0036 |
| 9,632,227 | B2* | 4/2017 | Kawaida | H04N 5/64 |
| 2003/0128538 | A1 | 7/2003 | Shinohara | |
| 2008/0267572 | A1 | 10/2008 | Sampsell et al. | |
| 2011/0244187 | A1 | 10/2011 | Rinko | |
| 2011/0297220 | A1* | 12/2011 | Rinko | G02B 6/42 156/219 |
| 2012/0099325 | A1* | 4/2012 | Ghosh | G02B 6/0001 359/853 |
| 2012/0188792 | A1* | 7/2012 | Matsumoto | G02B 6/0036 362/621 |
| 2013/0315534 | A1 | 11/2013 | Huang et al. | |
| 2014/0140091 | A1 | 5/2014 | Vasylyev | |
| 2015/0253487 | A1* | 9/2015 | Nichol | G02B 6/0076 362/610 |
| 2018/0088270 | A1* | 3/2018 | Tuohioja | G02B 26/005 |
| 2020/0257044 | A1* | 8/2020 | Rinko | G02B 6/02038 |

OTHER PUBLICATIONS

International Search Report issued in International Patent Application No. PCT/IB2019/052345, dated Jun. 18, 2019.
Written Opinion issued in International Patent Application No. PCT/IB2019/052345, dated Jun. 18, 2019.
Japan Official Action received in JP Application No. 2020-550661, dated Dec. 13, 2022.

* cited by examiner

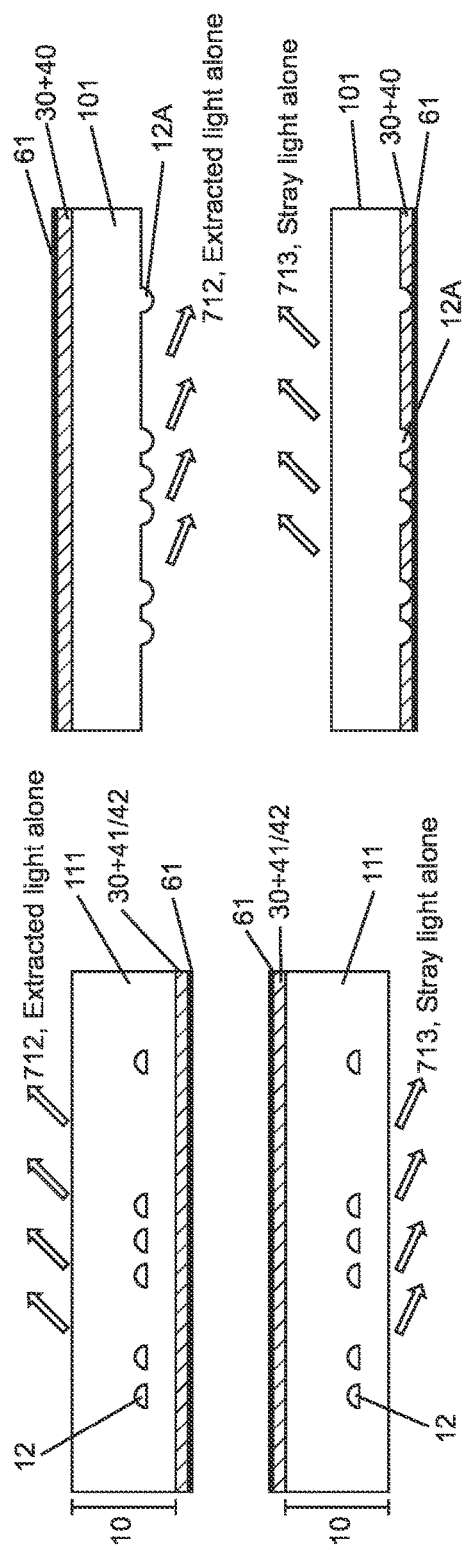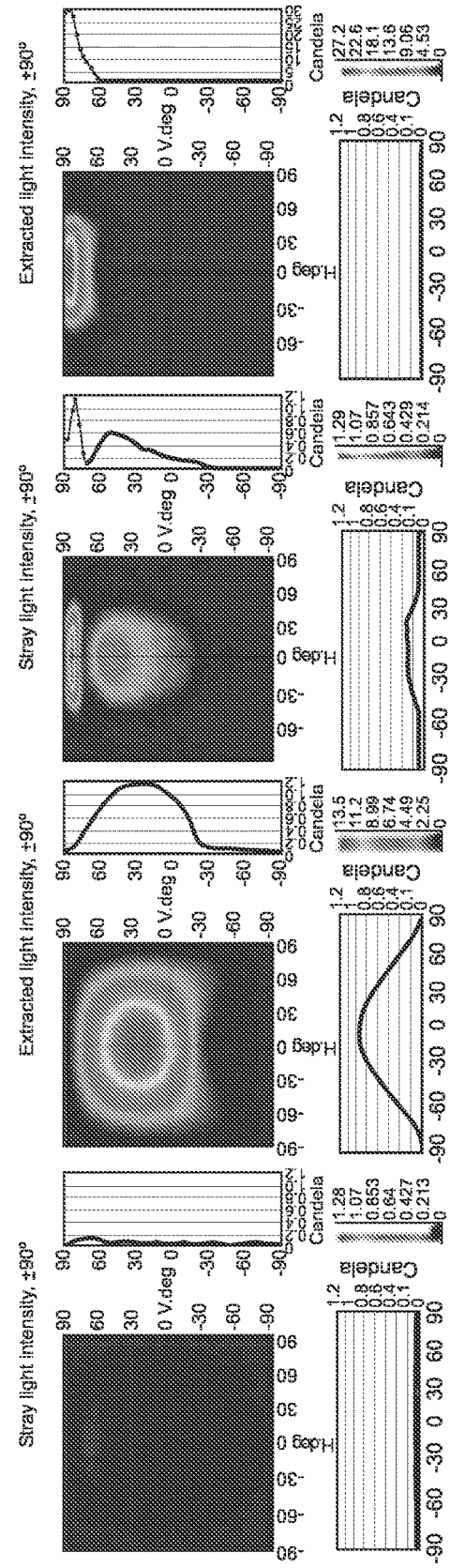
FIG. 7

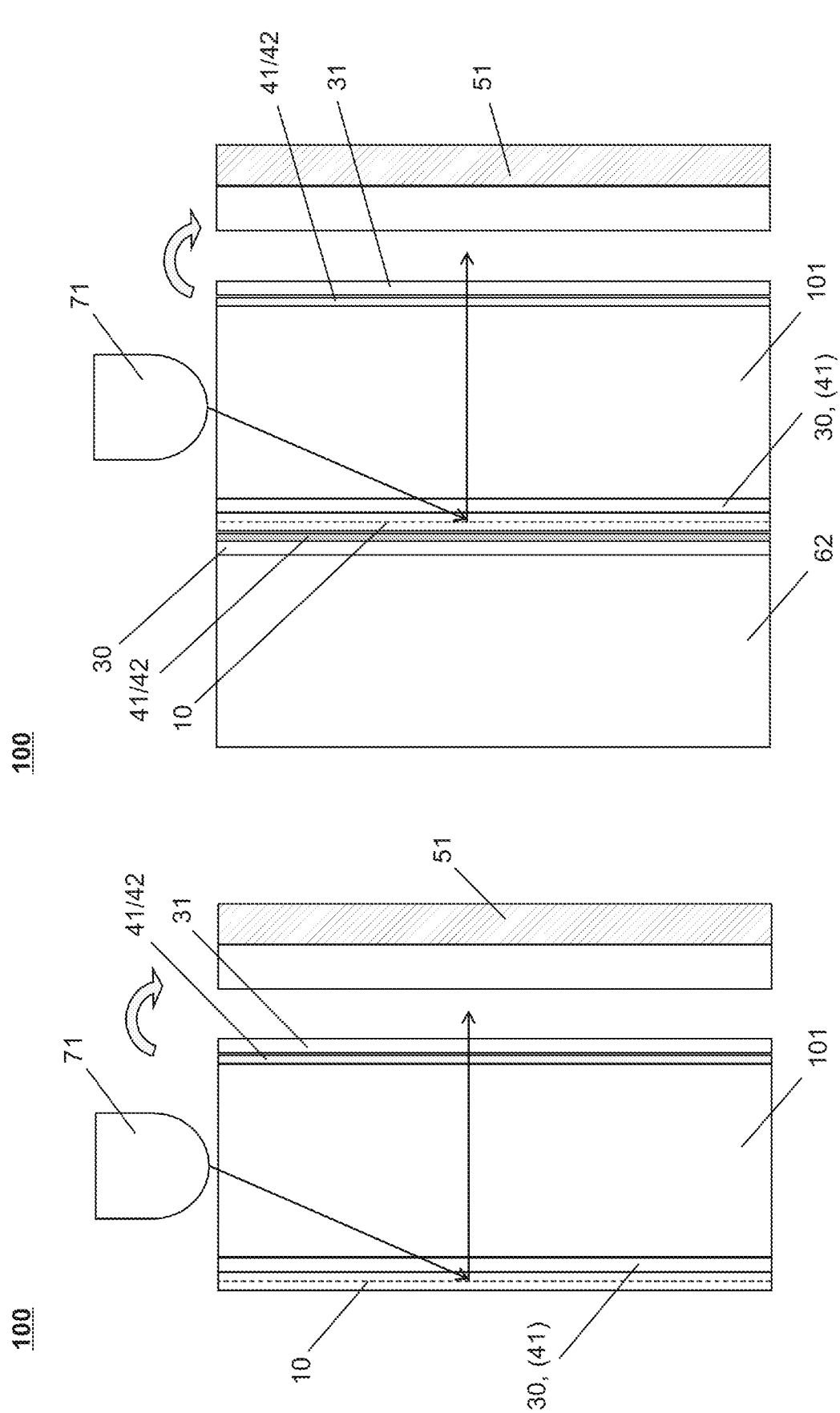

OPTICAL DEVICE

FIELD OF THE INVENTION

Generally the present invention pertains to light-transmissive substrate optics. In particular, the present invention concerns an optically transparent light distribution element, such as a lightguide, and a method of manufacturing thereof. The invention further concerns an optically transparent illumination device comprising light distribution element.

BACKGROUND

Transparent illumination devices gain importance in a variety of applications, such as general luminaire, window and façade illumination, reflective and transparent display illumination, street and traffic signage, etc. Four main challenges exist to provide a good transparent solution, namely: 1. Surface relief optical pattern, open structure; 2. Light distribution management; 3. Stray light control; and 4. High transparency. Several frontlight solutions have been developed in past; however, most of those have failed and never penetrated to the market for different reasons.

Open optical structure causes problems due to contamination and physical defect risk. This solution is not suitable for most real industrial applications. Fully integrated, laminated illumination devices cannot utilize surface relief pattern solutions. Additionally, open structures have always light leakages, developed as stray light.

Depending on optical requirements and specifications, light distribution control without any additional optical sheets, such as brightness enhancement films (BEFs), has been always extremely challenging to achieve. Transparent devices are not capable of utilizing any extra sheets without reducing transparency. Additionally, preferred light extraction remains a challenge. Moreover, provision of a fully integrated device (by lamination, for example), does not allow addition of any separate optical sheets. Only very advanced optical solution can resolve this problem.

Any kind of surface illumination devices, such as a signage, a display illumination with visual viewing performance, is supposed to have minimized stray light in viewing direction, because it can lower the visual contrast ratio dramatically. This feature is a big challenge almost in all applications. The reason is that the optical pattern itself can cause stray light by light leakage and Fresnel reflection. Light rays arriving to optical pattern (inside the lightguide) at a majority of incident angles are extracted at a first optical pattern surface (a light entrance surface); however, some light rays that arrive at certain angles of incidence are transmitted through the pattern and can cause undesired stray light and Fresnel reflection. Additionally, non-laminated device solutions always caused Fresnel stray light by their external surfaces.

Finally, optical transparency always depends on optical pattern features and their properties and visibilities with and without ambient light. Naturally, larger features are more visible, but even smaller features become visible when device is illuminated, because low pattern density may form visible bright spots that typically cause stray light for a viewing angle.

FIGS. 1a-1b shows a conventional lightguide 1 solution, wherein FIG. 1a is an open-surface lightguide and FIG. 1b is a lightguide comprising air-cavities 12A formed in a lightguide medium 2.

FIGS. 1a-1b shows a fundamental problem of undesired stray light in lightguides for frontlight-, backlight- and general illumination concepts, encountered by conventional solutions. Light leakage problem occurs in conventional surface relief patterns configured as open structures, as well as advanced cavity pattern structures. This is the common problem and there has been not reasonable solution offered yet.

FIG. 1c illustrates a frontlight solution utilizing cavity optics known from U.S. Application publication no. 2018/0088270 (Tuohioja et al). FIG. 1c that depicts FIGS. 4A-4C of the abovementioned publication provides, among others, a cross-sectional view of light distribution angles. Developing stray light is indicated by a circle on the conoscopic FIG. 4C (numbering pertains to that in the reference publication). Mentioned publication does not teach how to minimize the stray light problem; neither teaches how to optimize incoupled light distribution together with the first pattern surface design in order to achieve preferred illumination without stray light, which lowers viewing performance, e.g. contrast, of the display. The publication further lacks indication on dealing with decreased contrast performance and transparency caused by Fresnel reflection.

In fact, known solutions generally involve extracting light by pattern profiles, wherein light arrives at said profiles at most suitable angles of incidence. Neither of these solutions deals with challenging angles of incident that involve development of stray light.

Some state of art solutions resolve some of the problems mentioned above, and general understanding of the antireflective layer (AR layer) on external surfaces of lightguides has been available for several years. However, those state of art solutions do not address all undesired properties; therefore, lack for solid solutions exists for a number of industrial applications. Cavity optics for transparent illumination purposes has been presented earlier without any real solutions for reducing light leakage and stray light improvement for the final quality performance target. The present disclosure addresses a number of actual problems, viz. how to achieve the preferred transparent illumination solution including utilization models for some end-user product configurations.

In this regard, an update of technology in the field of manufacturing essentially transparent illumination devices is still desired, in view of addressing challenges associated with the eliminating or at least minimizing scattering and/or development of stray light in the optical patterns.

SUMMARY OF THE INVENTION

An objective of the present invention is to at least alleviate each of the problems arising from the limitations and disadvantages of the related art. The objective is achieved by various embodiments of a transparent optical device, according to what is defined in the independent claim 1.

In an embodiment, a transparent optical device is provided comprising a lightguide medium configured for light propagation, an at least one optically functional layer comprising at least one optically functional feature pattern formed in a light-transmitting carrier medium by a plurality of embedded features provided as optically functional internal cavities, wherein said at least one feature pattern is configured to perform an incident light control function and at least a light outcoupling function by establishing a predetermined incoupled light distribution at the pattern and/or by modifying the refractive indices of materials and elements provided in the optical device and interfaces therebetween, whereby stray light is minimized and optical transparency of the device is established.

In an embodiment, in said transparent optical device, the optical function or functions of the optically functional layer is/are established by an at least one of the: dimensions, shape, periodicity and disposition of the cavities within the feature pattern and by a fill factor value for said feature pattern.

In an embodiment, in said transparent optical device, the cavities in the at least one feature pattern comprise an entrance surface and an exit surface, wherein the entrance surface is configured to incouple incident light arriving thereat and to direct light rays into the cavity towards the exit surface, and wherein the exit surface is configured to receive light rays arriving thereat and to transmit said light rays outside the cavity into the light-transmitting carrier medium for propagation and/or for outcoupling.

In an embodiment, in said transparent optical device, the exit surface is configured to transmit light with at least a refraction function.

In an embodiment, in said transparent optical device, the entrance surface is configured to incouple light arriving thereto at a predetermined angle of incidence or a range of angles of incidence smaller than the critical angle relative to the surface normal, whereby outcoupled Fresnel reflection is avoided.

In an embodiment, in said transparent optical device, the entrance surface is further configured to incouple light arriving thereto with a collimation function and to direct light rays into the cavity such that light propagates through the cavity while avoiding hitting any other surface except the exit surface.

In an embodiment, in said transparent optical device, the cavities in the at least one feature pattern 11 are configured to outcouple incident light arriving at the entrance surface, via a total internal reflection (TIR) function.

In an embodiment, in said transparent optical device, the cavities in the at least one feature pattern comprise an antireflective layer disposed at the entrance surface within an interior of the cavity. In an embodiment, the cavities in the at least one feature pattern further comprise an antireflective layer disposed at the exit surface within an interior of the cavity.

In an embodiment, in the transparent optical device, the cavities are filled by a gaseous medium, preferably, with air.

In an embodiment, in the feature pattern provided in said transparent optical device the embedded cavity features alternate with a plurality of related light passages.

In an embodiment, the embedded feature pattern is established in the light-transmitting carrier medium by a laminate structure formed by an entirely flat, planar layer of the carrier medium arranged against a patterned layer of the carrier medium, whereby a plurality of optically functional internal cavities is formed at an interface between the layers.

In an embodiment, the transparent optical device further comprises an antireflective layer disposed at the interface between the layers formed by the light-transmitting carrier medium.

In an embodiment, in the transparent optical device, the embedded optical cavity features are selected from the group consisting of: a groove, a recess, a dot, and a pixel, wherein said cavity features have crosswise profiles selected from: binary-, blazed-, slanted-, prism-, trapezoid-, hemispherical profiles, and the like, and wherein said features have lengthwise shape selected from: linear, curved, waved, sinusoid, and the like.

In an embodiment, in the transparent optical device, the at least one feature pattern is a hybrid pattern comprising a plurality of discrete feature profiles and/or a plurality of at least partly continuous feature profiles.

In an embodiment, in the transparent optical device, the at least one feature pattern is fully integrated and/or embedded within the light-transmitting carrier medium.

In an embodiment, the transparent optical device further comprises an at least one antireflective layer disposed on the optically functional layer, whereby the feature pattern is configured to cooperate, in terms of its optical function or functions, with said antireflective layer such as to avoid Fresnel reflection.

In an embodiment, in the transparent optical device, the lightguide medium and the optically functional layer are an optical polymer and/or glass.

In an embodiment, the transparent optical device further comprises an at least one optical filter layer disposed on an at least one surface of the lightguide medium and provided with an at least one optical function through its entire surface coverage or at predetermined areas thereof, wherein the at least one optical function of said optical filter layer, in terms of at least the material it is formed of, is selected from: reflection, transmission, polarization, and refraction.

In an embodiment, said optical filter layer is formed of a substrate material having a refractive index lower than the refractive index of material constituting the optically functional layer and, preferably, lower than the refractive index of material constituting the lightguide medium.

In an embodiment, the optical filter layer is configured as a reflective Total Internal Reflection layer structure.

In an embodiment, in said transparent optical device, the optical filter layer is disposed on both surfaces of the lightguide medium. In an embodiment, said optical filter layer is disposed between the lightguide medium and the optically functional layer.

In an embodiment, in the transparent optical device, the optical filter layer comprises a plurality of optical apertures to enable light transmission therethrough, said apertures being arranged within a predetermined location at said optical filter layer or extending along and/or across an entire surface of said optical filter layer.

In an embodiment, the transparent optical device further comprises an optical contact layer configured to establish an optical bonding with at least a part of an illumination surface.

In an embodiment, said optical contact layer is a uniform layer optionally provided with an at least one feature pattern comprising a plurality of optically functional features.

In an embodiment, said optical contact layer is configured to establish a non-permanent optical joint with the illumination surface. In an embodiment, said optical contact layer is configured to establish a permanent connection with the illumination surface.

In an embodiment, the transparent optical device further comprises at least one light source. In embodiment, in the transparent optical device optical transparency is established in presence and in absence of illumination derived from said at least one light source.

In an embodiment, the transparent optical device is configured as a frontlight illumination device or a backlight illumination device.

In another aspect, a transparent illuminated article is provided, in accordance to what is defined in the independent claim 37, which article comprises the transparent optical device according to the embodiments.

In still another aspect, use of the transparent optical device, according to the embodiments, is provided, in accordance to what is defined in the independent claim 39.

The utility of the present invention arises from a variety of reasons depending on each particular embodiment thereof. At first, the invention pertains to a novel light extraction pattern solution comprising In some preferred embodiments, the solution provided hereby is advantageously realized as integrated (internal) cavity optics. In typical solutions that involve optical cavities light is often partially transmitted (penetrated) into said cavities, whereby undesired refraction and Fresnel reflection is caused and perfect light distribution control is not achievable. On the contrary, in the solution presented hereby extracted light distribution (in terms of reflection and refraction angles and directions, accordingly) can be finally controlled with high precision by TIR extraction functionality of the associated optically functional feature pattern.

Optical transparency of the present device is attributable to a number of structural characteristics that allow for avoiding or at least minimizing an amount of scattered- and stray light caused by Fresnel reflections, for example. The solution allows for improving visual quality of an image on a display device, for example, by eliminating haziness, ghosting, formation of double images due to stray light, "washout" of colour display, and avoiding a lower display contrast.

The solution can be utilized for frontlight and backlight, window and façade illumination, signage and signal lighting, solar applications, decorative illumination, light shields and masks, public and general illumination, such as roof lighting, and the like. There are several applications and market trends, which require these special and advanced transparent lightguide solutions, wherein different features and its optimization are required.

Present disclosure is focused on providing the optical device with markedly improved transparency with light off and on modes that further enables eliminating or at least minimizing harmful stray light and Fresnel reflections.

It should be emphasized that in conventional solutions, light incident optical patterned structures at a majority of angles is extracted at the first optical pattern surface (a light entrance surface); however, some light rays that arrive at certain angles of incidence are transmitted through the pattern and can cause undesired stray light and Fresnel reflection.

The optical device presented hereby is primarily configured for light-coupling and illumination purposes. Transparency thereof is attained by thorough selection of materials and element design, which are targeted, on the whole, to minimizing stray light by a variety of ways, whereby Fresnel reflection is also minimized.

The terms "optical" and "light" are largely utilized as synonyms unless explicitly stated otherwise and refer to electromagnetic radiation within a certain portion of the electromagnetic spectrum, preferably, but not limited to, visible light.

In its broadest sense, the term "optical filter" or a "light filter" refers, in the present disclosure, to a device or a material used to change the spectral intensity distribution or the state of polarization of electromagnetic radiation incident thereupon. The filter may be involved in performing a variety of optical functions, selected from: transmission, reflection, absorption, refraction, interference, diffraction, scattering and polarization.

In its broadest sense, the term "lightguide" or "waveguide") refers, in the present disclosure, to a device or a structure configured to transmit light therealong (e.g. from a light source to a light extraction surface). The definition involves any type of the lightguide, including, but not limited to a light pipe type component, a lightguide plate, a lightguide panel, and the like.

The term "carrier" or "carrier medium" generally refers to a flat, planar member composed of a substrate material configured for light propagation and optionally constituting a layered structure.

The term "element" is used in the present disclosure to indicate a part of an entity.

The expression "a number of" refers herein to any positive integer starting from one (1), e.g. to one, two, or three; whereas the expression "a plurality of" refers herein to any positive integer starting from two (2), e.g. to two, three, or four.

The terms "first" and "second" are not intended to denote any order, quantity, or importance, but rather are used to merely distinguish one element from another.

BRIEF DESCRIPTION OF THE DRAWINGS

Different embodiments of the present invention will become apparent by consideration of the detailed description and accompanying drawings, wherein:

FIG. 7 is a comparison chart for a solution implemented according to some embodiment and a conventional frontlight.

FIGS. 13 and 14 schematically show a stack of the transparent optical device, according to some embodiments, in conjunction with an illumination surface.

DETAILED DESCRIPTION OF THE EMBODIMENTS

Figures 1A, 1B:
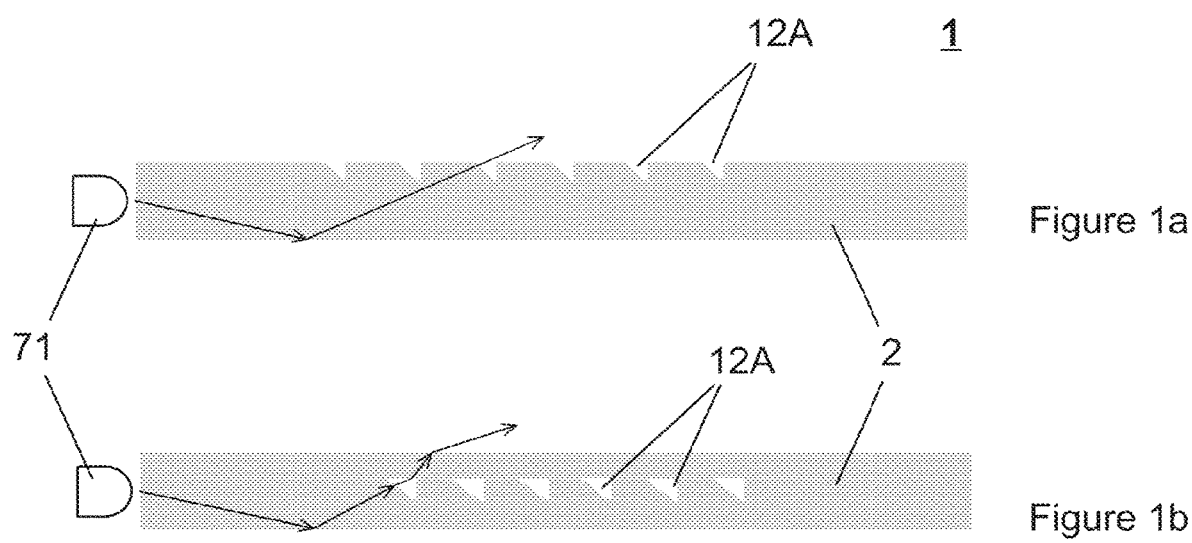
FIGS. 1a-c shows conventional lightguide solutions.
Figure 1C:
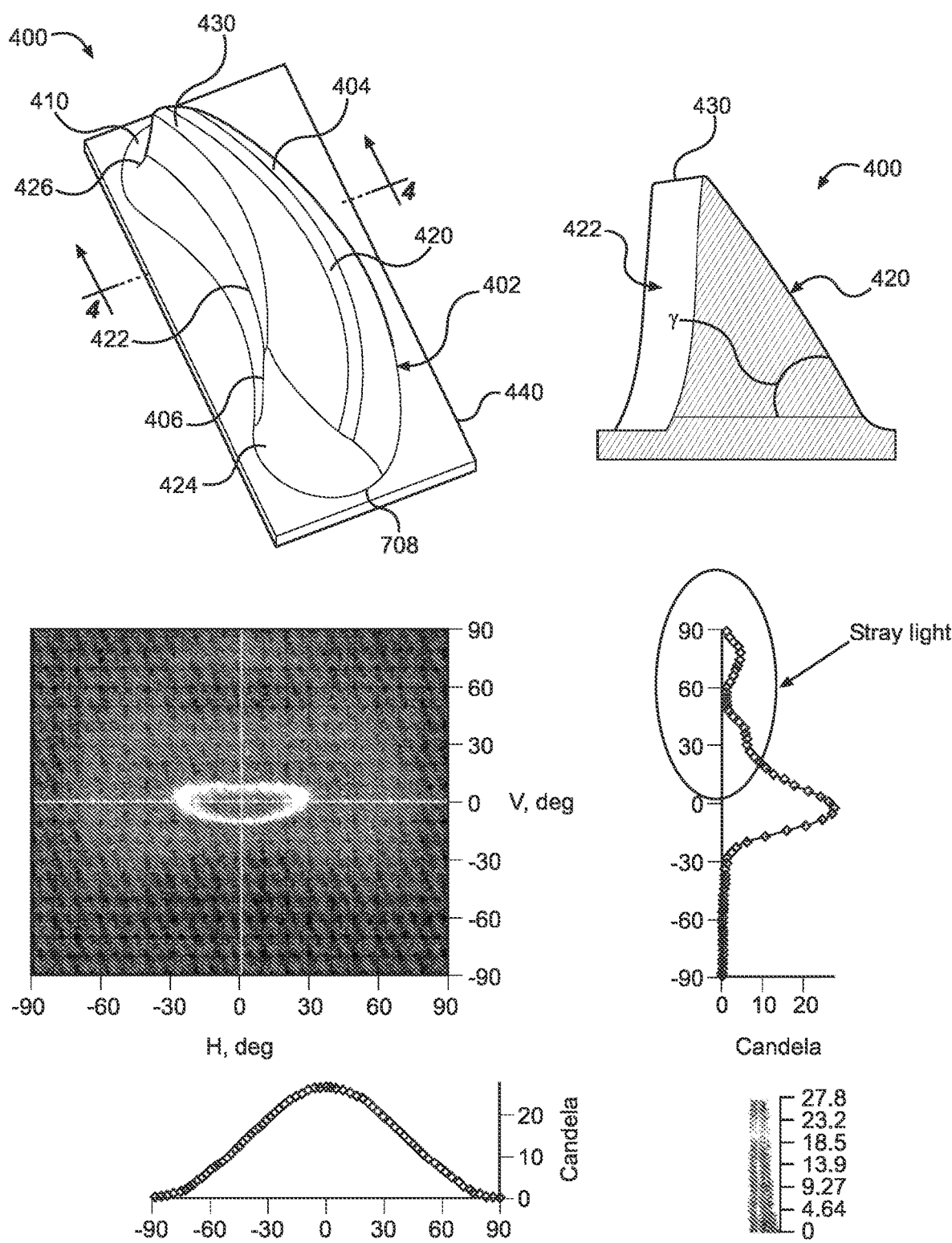

Detailed embodiments of the present invention are disclosed herein with the reference to accompanying drawings. The same reference characters are used throughout the drawings to refer to same members. Following citations are used for the members:

1, 2—a conventional light guide with a lightguide medium, accordingly;

10—a light distribution layer structure;
11—optical feature patterns;
111, 111A, 111B—a light-transmitting carrier medium;
12—optical (pattern) features;
121, 122—a light entrance surface and a light exit surface of an individual optical feature, accordingly;
12A—optical (pattern) features (prior art);
13—light passages;
21, 211—antireflective layers;
30—an adhesive;
31—an optical contact bonding;
40—a layer with low refractive index (prior art);
41—an optical filter layer with apertures 41A;
42—an optical filter layer without apertures;
51—an illumination/viewing surface;
61—a light absorbing surface;
62—a cover;
100, 100A—a transparent optical device;
101—an optically transparent substrate;
71—a light source;
711—incident light;
712—extracted (out-coupled) light;
713—stray light alone;
714—stray light by Fresnel.

Figure 2:
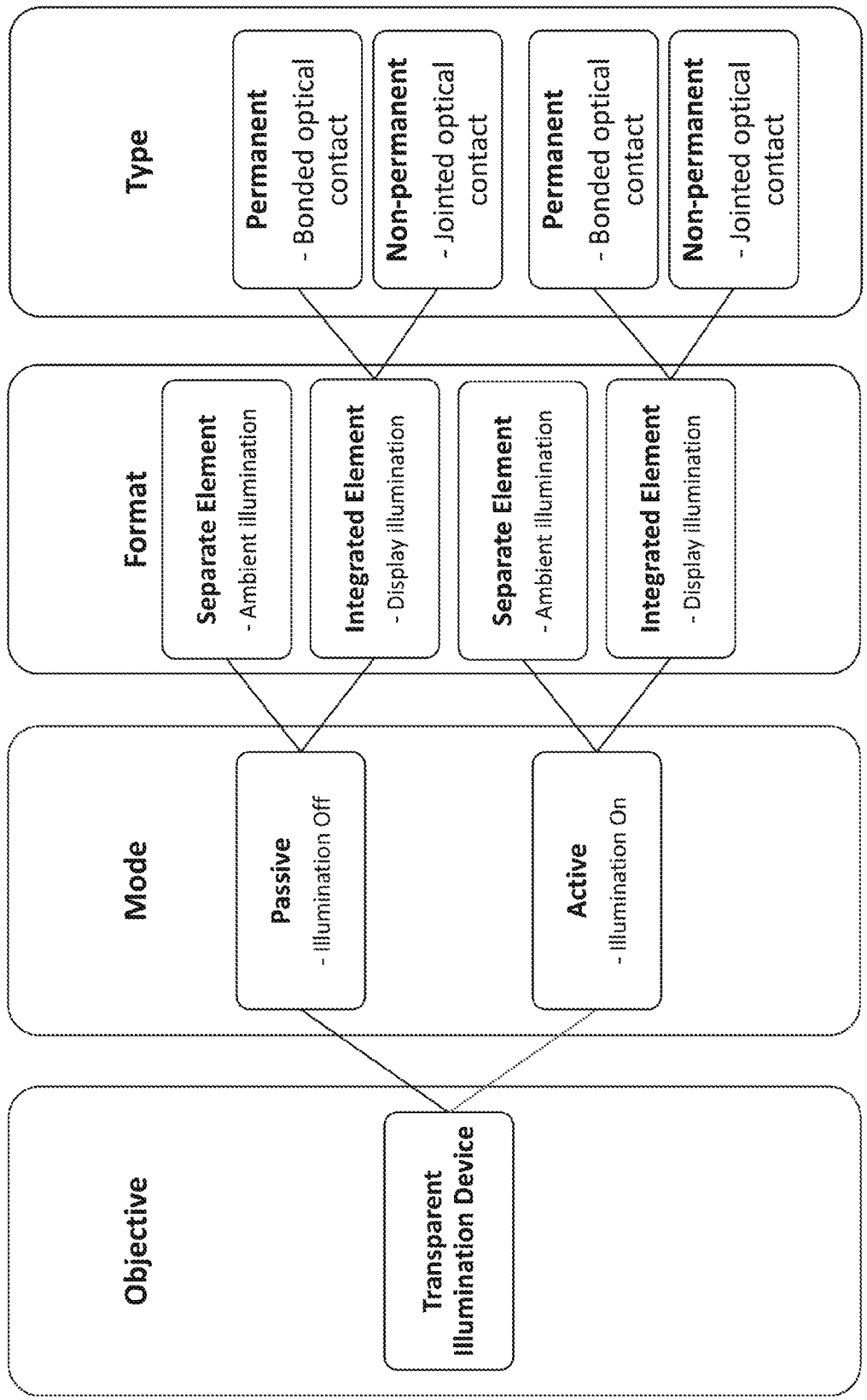
FIG. 2 is a chart that defines a variety of features incorporated into a number of solutions for a transparent illumination device, viz. transparent optical device, according to some aspect.

A fully transparent lightguide solution embodied at 100, 100A, hereafter, the optical device 100, 100A, is discussed hereinbelow. FIG. 2 shows is a chart that defines different phases of feature characterization by which the transparent lightguide solution can be attained.

The present disclosure thus provides inter alia for a lightguide solution whose transparency does not depend on illumination mode. The optical device 100, 100A is transparent when light is on and when light is off. Present solution further exploits a concept of light outcoupling (extraction) at predetermined angles, whereby undesired stray light can be avoided.

In case an exemplary transparent lightguide element is not utilized for illumination purposes, it is in a passive mode, whereby visual transparency through the element is typically required. For example, a reflective display does not need illumination in ambient light conditions (e.g. in sunlight conditions). Thus, to establish frontlight illumination without lowering visual properties of said display, the lightguide solution must be fully transparent. Sunlight incident at some angles may cause haziness, colour distortion or lowering of contrast by Fresnel reflection or back-reflection. Mentioned drawbacks are eliminated in the optical device 100, 100A according to the embodiments.

In an active mode, the optical device 100, 100A can be configured to provide illumination for a single side of an illumination surface (such as a display or a poster) or dual-side illumination (such as a façade or a window). It is important to specify illumination purpose in each case, in view of preferred illumination distribution, visual angle range etc., in order to construct the optical device in a manner most beneficial for eliminating or at least minimizing undesired stray light, in particular, in display and façade illumination.

Based on the status (passive or active), basic criteria for the optical device solution can be classified as follows:

I. Transparency criteria for the passive mode (non-illuminated): a) minimized haziness, absence of scattering, absence of colour distortion; b) minimized Fresnel reflection, c) non-visible optical pattern features, d) non-visible optical pattern density variation.

II. Transparency criteria for the active mode (illuminated): a) minimized stray light by the optical pattern, b) minimized Fresnel reflection by an optical interface (surface reflection or layer reflection), c) minimized Fresnel reflection by the optical pattern (internal reflection), d) optical extraction quality, absence of scattering (reflection, total internal reflection).

Naturally, transparent illumination requires advanced optical materials for functional layers, which should be non-scattering and without colour shifting. This is the key issue, in particular, for lightguide medium, adhesives, such as optically clear adhesive (OCA) and low $R_i$ claddings. For example, continuous low $R_i$ cladding with non-physical apertures is a key solution to avoid scattering risk and greater amounts of stray light (see FIG. 4a). It has been observed that physical apertures provided in the cladding and laminated with a layer made of material with different refractive indices, cause light scattering, haziness and lower contrast ratio. Present disclosure enables an improved solution provided as a continuous low $R_i$ cladding with optical apertures defined by local index changes. This can be realized via higher index material absorption utilizing ink-jet printing, reversed off-set printing, laser or e-beam treatments, and the like. Thus, it is not necessary to have physical apertures with edges, at which light scattering can be caused. Additionally, OCA and other materials must not contain possess scattering properties or colour shift features.

To produce an optimal transparent illumination device for each different product solution, it is important to understand fundamental criteria and solutions to proceed. The present invention addresses a fundamental problem, in particular, in view of improving internal cavity performance by reducing stray light leakage at profile surfaces and eliminating or at least minimizing internal Fresnel reflection. Best results can be attained by combining two or more characteristic features. A number of primary solutions on achieving transparency and reduction of stray light/undesired Fresnel reflections are presented hereinbelow.

1. An optical cavity pattern solution, in which optical profiles are formed by relatively small features (not exceeding 25 µm), which cannot be captured by human eye. Larger features can be utilized in combination with antireflective (AR) coatings or AR patterns disposed on profile surfaces (hybrid pattern), which makes the basic pattern more invisible to human eye. Surface quality has to be of optical grade, which does not cause any scattering, thus causing no stray light.

2. An optical cavity pattern solution, in which the optical pattern design can be distinguished by a constant pattern density or a gradient pattern density, wherein a Fill factor for the pattern density has to retain low, such as 10-50% of a total area. Also, a range of Fill factor variation between the neighboring local regions should be approximately (±) 3%, whereas the same between the opposite corner regions—approximately (±) 20% in order to avoid/minimizing pattern visibility due to high—and low Fill factor variations between different regions.

3. An optical cavity pattern solution, in which a first surface of the cavity pattern profile is configured to extract/outcouple all light based on total internal reflection (TIR) or refraction; therefore no light is transmitted inside an optical cavity (FIG. 3a, 3i), in order to avoid and minimize stray light and Fresnel reflection. Typically, this type of sole light management and arrangement requires light source or light incoupling collimation in at least a vertical direction, whereby limiting a range of angles incident at the lightguide element.

4. An optical cavity pattern solution, in which a first surface of the cavity pattern profile is extracting and redirecting inside the cavity to meet the second surface without any light leakage and without development of stray light by refraction on the bottom of cavity interface surface, viz. a bottom surface of the cavity. Such avoidance requires a solution, wherein the first surface of the (cavity) pattern profile is configured to receive light incident at predetermined angles of incident, in particular, angles of incidence smaller than the critical angle relative to the surface normal, for avoidance of leaked stray light. Incident light can be limited by optical collimation (optics) or provision of an absorption layer to receive light incident at larger angles (i.e. exceeding the critical angle) at the light in-coupling edge (FIGS. 3e-3h).

5. A symmetric optical cavity pattern solution, in which the first surface extracts light and the second surface transmits or redirects light without outcoupling, so it does not directly outcouple undesired Fresnel reflection out of the lightguide element (FIGS. 3b, 3j and 3c). If a periodic pattern is utilized, the second surface is configured to cooperate with the next pattern surface in terms of improved light direction and extraction/outcoupling efficiency.

6. A symmetric optical cavity pattern solution, in which the first surface extracts light and the second surface transmits or redirects light without outcoupling, thereby, undesired direction of Fresnel reflection is minimized (FIG. 3c).

6. An optical cavity pattern solution, in which the first surface and/or the second surface can be provided with an antireflective coating or an antireflective structure, preferably, broadband anti-reflection (AR) by an AR pattern or a multi-layer coating, or a low $R_i$-coating, in order to minimize e.g. Fresnel reflection (FIGS. 3d, 3g). The pattern and the AR structure/coating form a hybrid-structure with multifunction.

7. The optical cavity pattern profile can be binary, blazed, slanted, micro lens, trapezoid, and the like (FIGS. 3a-3l). Profiles are three-dimensional and can form dots, linear or non-linear lines, pixels, multi-shaped features including variable patterns. These profiles in the air-cavity solution can be utilized alone, without any coatings or sub-patterns, but they can utilize AR-coatings or the AR-pattern features provided on the primary optical profile, as provision of said AR-coatings/structures makes the pattern more invisible.

8. Upon forming an optical cavity pattern profile, one of the sub-layers (see FIG. 3l) with an entirely flat surface can be provided with an AR-coating or an AR-pattern, which will remain only in the air-cavity pattern after two-layer lamination, bonding. In the two-layer bonding, the optical interface shall disappear and the AR-function shall be terminated. Only cavity area has an active AR-surface (FIG. 3l).

Figure 9:
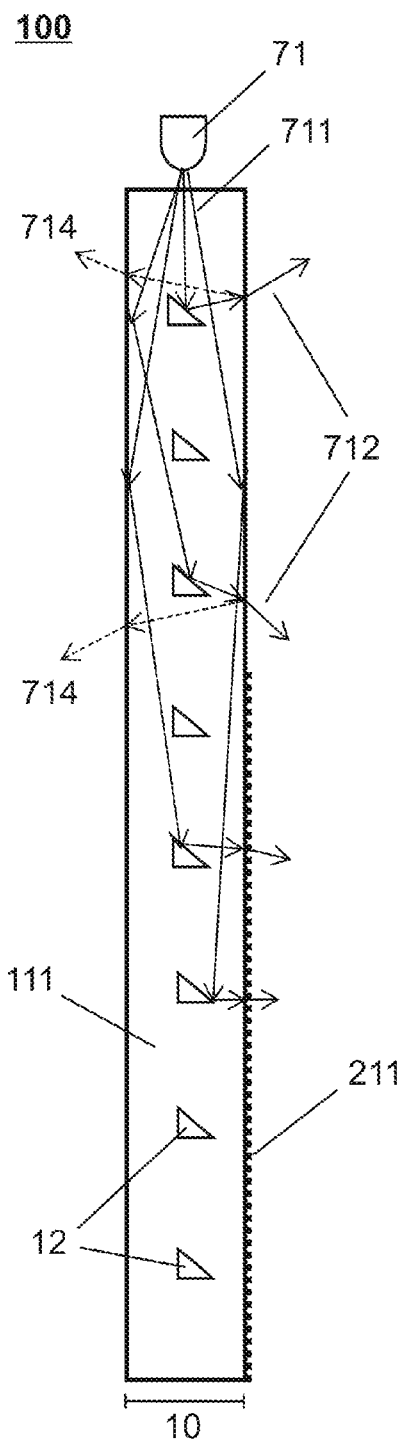
FIGS. 9 and 10 schematically show the transparent optical device according to some embodiments, in view of minimizing Fresnel reflection.
Figure 10:
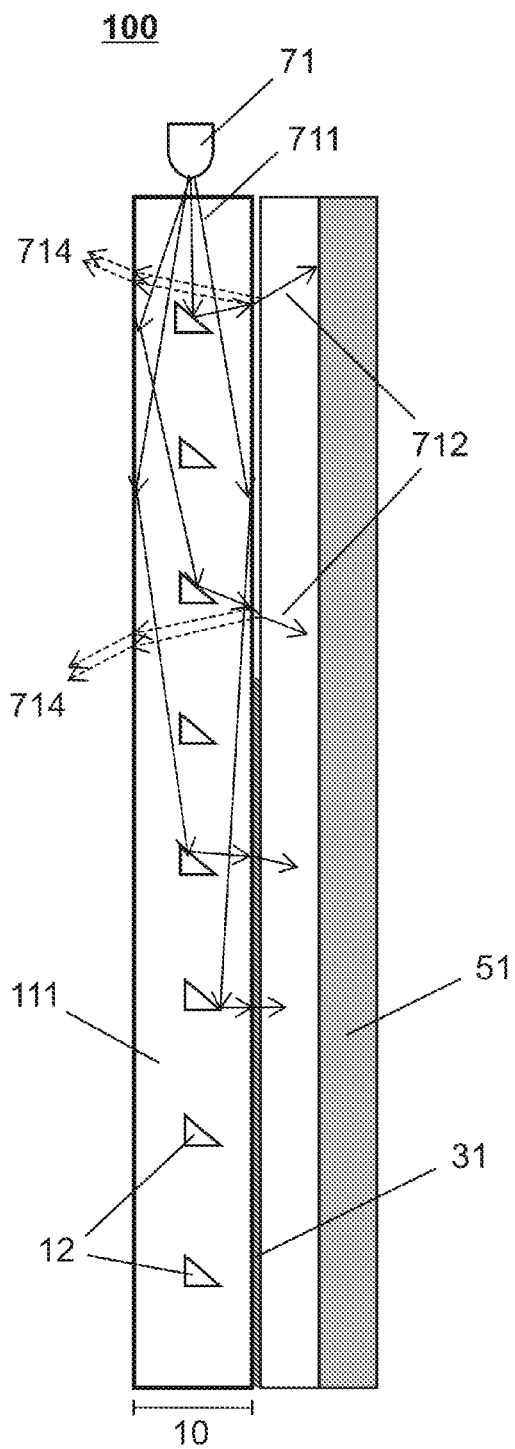

9. An optical cavity pattern element, in which one surface is a light extraction surface for ambient illumination (single side) with the AR-layer (AR-coating or AR-pattern) on an external side in order to minimize undesired Fresnel reflection in an opposite direction (FIG. 9). In case of dual side light extraction, AR-layers are not needed 10. An optical cavity pattern element, in which one surface is a light extraction surface for display lamination (single side) having optical contact on the display surface by optical bonding material in order to minimize undesired Fresnel reflection in an opposite direction (FIG. 10). Additionally, the same extraction surface may have AR-coating or AR-pattern to minimized interface Fresnel reflection between a lightguide and a bonding layer.

Figure 4A:
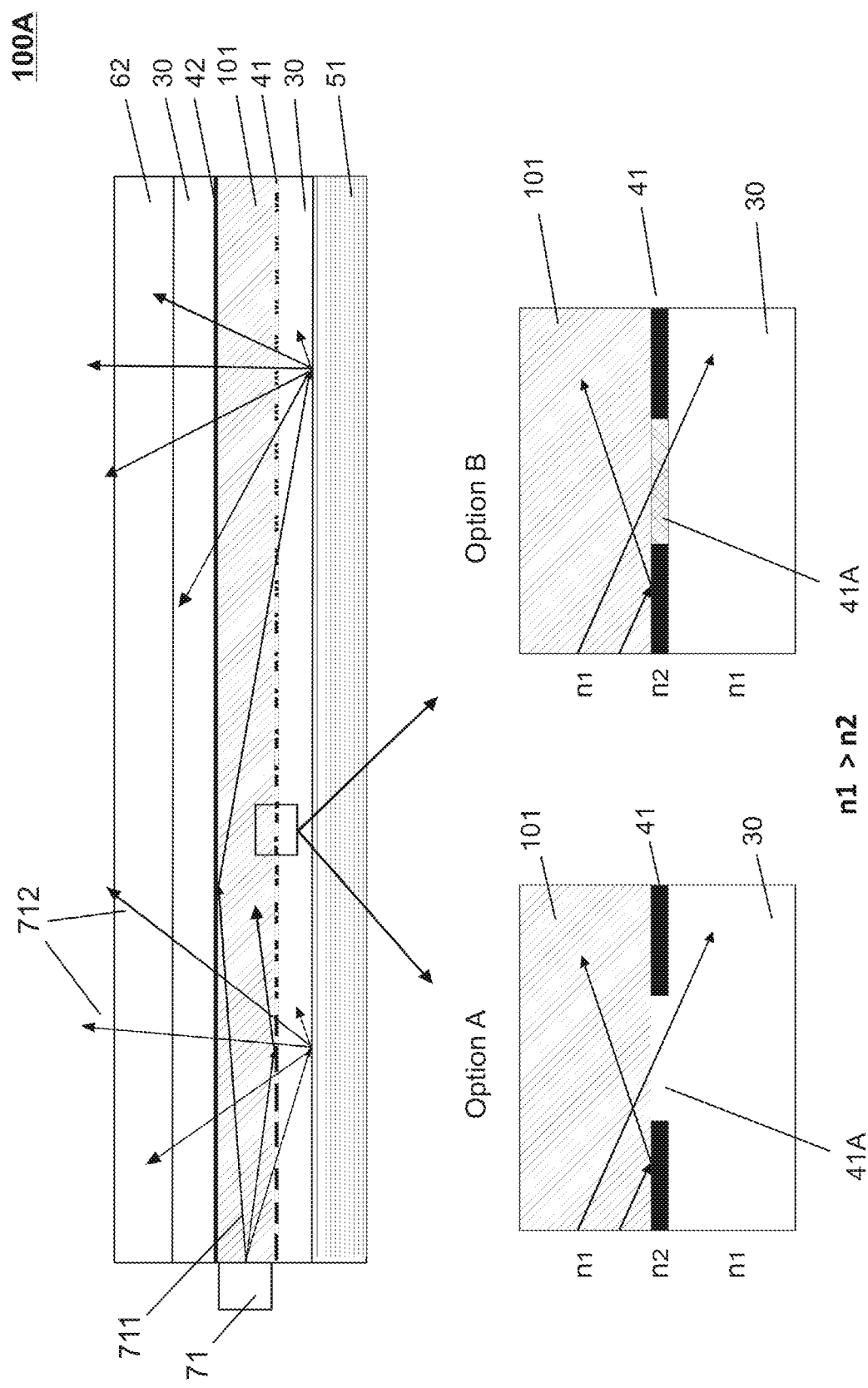
FIGS. 4a-4c schematically show a transparent optical device configured for frontlight illumination, according to some embodiments.
Figure 4B:
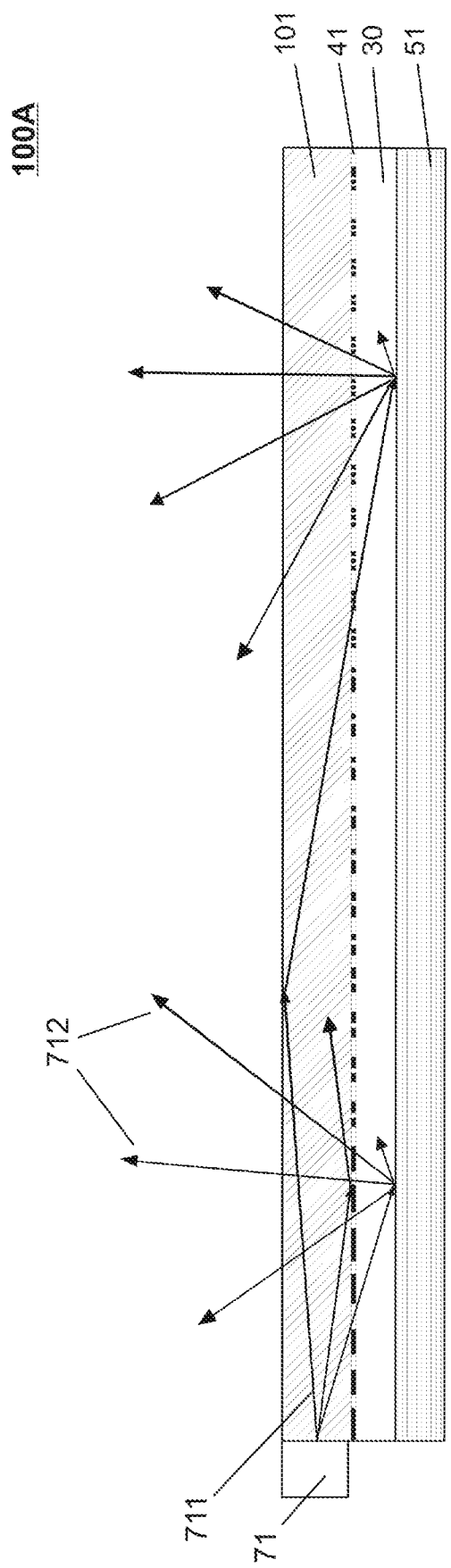

11. An optical pattern-free lightguide element, in which one surface is light filtering surface, wherein light passing through it by non-physical apertures in order to provide preferred illumination on the display surface by optical bonding. Light filtering surface is formed with low refractive index cladding with optical transmission contacts, apertures (FIG. 4a, 4b).

12. Using optical cavity pattern solution, in which whereby all optical layers are transparent and non-scattering without colour shifting, such as the low $R_i$ cladding layer, the OCA layer, i.e. the layers without any physical light scattering features.

13. An optical cavity element, in which the pattern profile is optimized to minimize scattering of diffraction distortion, wherein sharp tips and forms are minimized, rounded or flattened.

Transparent lightguide and transparent cavity optics have many applications. Typically, the optical pattern itself has to be designed and optimized on a case-by-case basis.

In some configurations, the at least one optical pattern provided within the optically functional layer is established by the relief forms selected from the group consisting of: a groove, a recess, a dot, and a pixel, wherein said relief forms have crosswise concave or convex profiles selected from: binary, blazed, slanted, prism, trapezoid, hemispherical, and the like, and wherein said relief forms have lengthwise shape selected from: linear, curved, waved, sinusoid, and the like.

Figure 11:
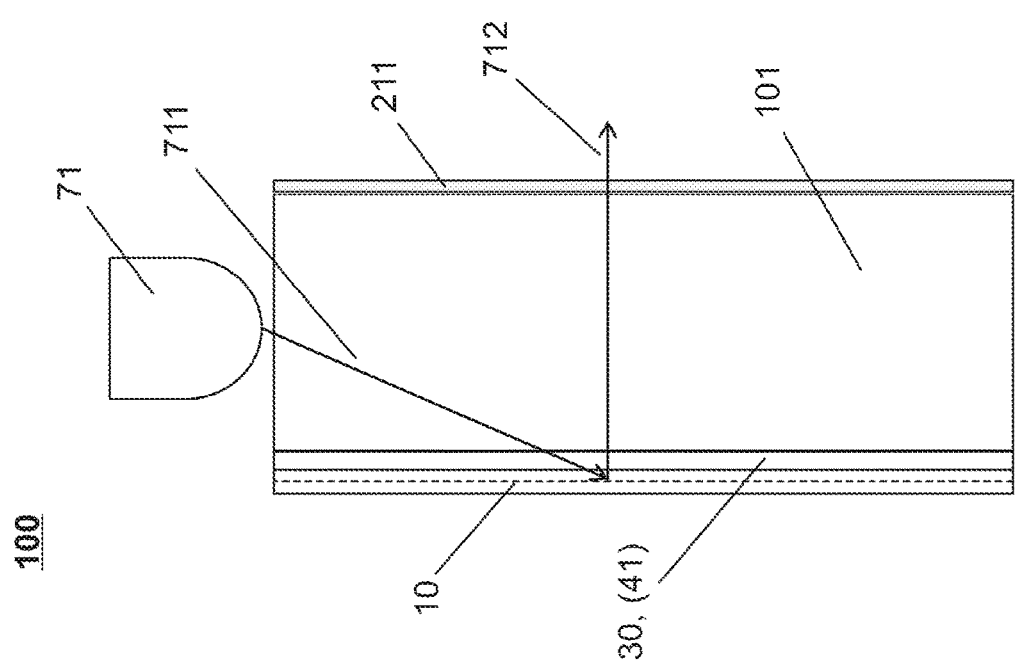

A concept underlying various embodiments of a transparent optical device, referred to, in some instances, as a "transparent illumination device", is illustrated at FIG. 11. By the term "transparent" we refer to a function of optical transparency generally defined as a physical property of material that allows photons arriving at a surface of said material to pass through the material unaffected, such as without being scattered, absorbed or back-reflected. Optical transparency of the present device 100 is established by a number of structural attributes described hereinbelow that allow for avoiding or at least minimizing an amount of scattered- and stray light caused by Fresnel reflections, for example, whereby visual haziness, ghosting and/or formation of double images due to stray light and colour "wash-out", etc. are further eliminated.

To optimize the transparent illumination device 100, 100A for different product configurations (e.g. frontlight, backlight, illumination plate for a variety of illuminated targets), it is important to understand fundamental criteria and requirements implied by the end product to proceed with. Present disclosure provides a comprehensive solution for transparent optical devices with internal cavity performance optimized, in particular, in terms of avoiding stray light produced by light leakage via the profile surfaces and/or by internal Fresnel reflection. Different configurations presented herein below involve a combination of two or more characteristics directed to attaining transparency and on avoiding stray light.

The transparent optical device 100, hereafter, the optical device 100, comprises a lightguide medium 101 and at least one optically functional layer 10. The lightguide medium is advantageously configured for light propagation, whereas the optically functional layer 10 is configured to establish optical transparency of the device 101 via a control function over light incident thereto and via at least a light outcoupling function.

Mentioned optical functions are attributable, in a non-limiting manner, to provision of at least one optically functional feature pattern 11 (FIG. 9).

FIG. 9 is a cross-sectional view of the optically functional layer 10, according to some basic embodiment. The layer 10 thus forms a light distribution structure and comprises at least one feature pattern 11 established in a light-transmitting carrier medium 111 by a plurality of embedded optical features. The optical features are formed by a plurality of internal optical cavities 12 (viz. internal, embedded or integrated cavity optics). The latter are further referred to as "cavities" or "cavity profiles".

A reference is made to FIG. 3*l* that shows internal organization within the layer structure 10, whereupon an entirely flat, planar layer 111A of the carrier medium is arranged against a patterned layer 111B of the carrier medium such, that an internal (viz. embedded or integrated) feature pattern 11 is established at an interface between a patterned layer 111 and a planar layer 111A. The boundary between the carrier layers 111A, 111B is not shown to emphasize an essentially "one-piece" nature of the complete structure 10. The complete structure 10 is provided as a single layer.

In some instances, the optically functional layer 10 is provided in the form of a film, a sheet or a coating for a waveguide medium 101.

In embodiments, the transparent optical device 100 thus comprises the lightguide medium 101 configured for light propagation, and the at least one optically functional layer 10 comprising at least one optically functional feature pattern 11 formed in a light-transmitting carrier medium 111 by a plurality of embedded features provided as optically functional internal cavities 12. Said at least one feature pattern 11 is further configured to perform an incident light control function and at least a light outcoupling function by establishing a predetermined incoupled light distribution at the pattern 11 and/or by modifying the refractive indices of materials and elements provided in the optical device and interfaces therebetween, whereby stray light is minimized and optical transparency of the device 100 is established.

In embodiments, the optical function or functions of the optically functional layer 10 is/are established by an at least one of the: dimensions, shape, periodicity and disposition of the cavities 12 within the feature pattern 11 and by the Fill factor value for said feature pattern.

Optical features, such as cavities 12, are provided within a reference area, such as within the optically functional layer with the pattern 11. Within said reference area, design parameters for said optical features, such as fill factor and/or density, as well as period, pitch, height, length, angle, curvature, local pixel size, position, etc., may vary. Fill factor (FF), also referred to as filling factor, defined by a percent (%) ratio of the optical features 12 to a unit area, is one of the key parameters in designing optical solutions. FF thus defines a relative portion of the features 12 in the reference area.

The optically functional layer 10 with optical cavity pattern is typically design in an application-specific manner for transparent backlight, frontlight and illumination panels, whereby optical pattern design can be have or constant pattern density or gradient pattern density, wherein the Fill factor value for pattern density has to be at relatively low level, such as 10-50% of the total area.

Also, a range of Fill factor variation between the neighboring local regions should be approximately (±) 3%, whereas the same between the opposite corner regions— approximately (±) 20% in order to avoid/minimize pattern visibility due to high—and low Fill factor variations between different regions. Achieved transparency influences final efficiency; the more transparent is the solution, the greater efficiency can be attained. Maximal efficiency is attainable by both continuous periodic profiles and local profiles such as pixels. For transparent solution, maximal Fill factor can be optimized in terms of transparency, haziness and stray light. One significant benefit is to have constant and efficient 3D optical pattern (solid filling factor design), which can be utilized for multiple applications. This reduces mastering and product costs, and makes possible producing optical devices of relatively large sizes, e.g. greater than 0.5-1.5 m$^2$ (square meters).

Reference is made to FIGS. 3*a*-3*k* that illustrate various configurations for optical cavities 12 provided in the carrier medium 111 (shown on FIG. 3*l*). In configurations described, a refractive index value (n1) of said carrier medium 111 exceeds the refractive index value (n2) of medium that fills the embedded cavities 12. The cavities 12 comprise at least a first surface 121, configured as an entrance surface to receive incident light and a second surface 122, configured as an exit surface, through which light exiting the cavity is transmitted in the medium 111 to be utilized for illuminating a target surface. Only light that follows a predetermined path, by being guided by the cavity pattern, disclosed hereby, can be exploited for illumination purposes.

The light-transmitting carrier medium 111 is thus provided as an optical polymer or glass. In exemplary configurations, the carrier medium 111 is polymethyl methacrylate (PMMA).

In some configurations, the cavities 12 are filled with a gaseous medium. It is further preferred that the cavities 12 are filled with air. Nevertheless, any other gaseous medium, as well as any fluid, liquid, gel or solid, can be provided as a filling material for said cavities.

Figure 3A:
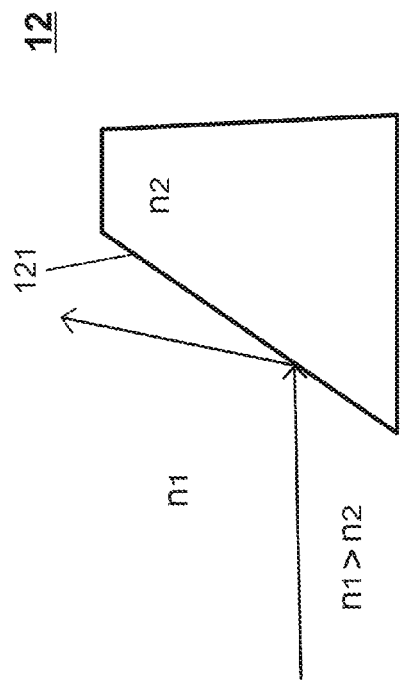
FIGS. 3a-3k show various configurations of optical features and light transmission therethrough.
Figure 3B:
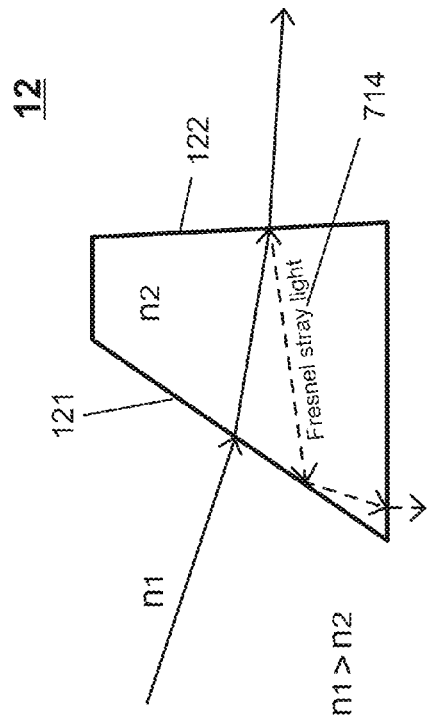
Figure 3C:
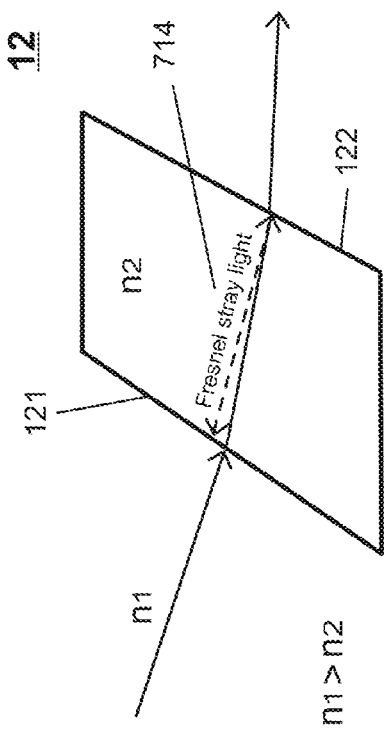
Figure 3D:
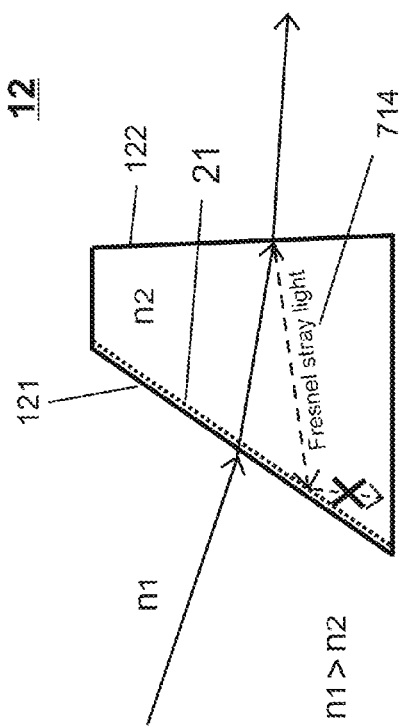
Figure 3F:
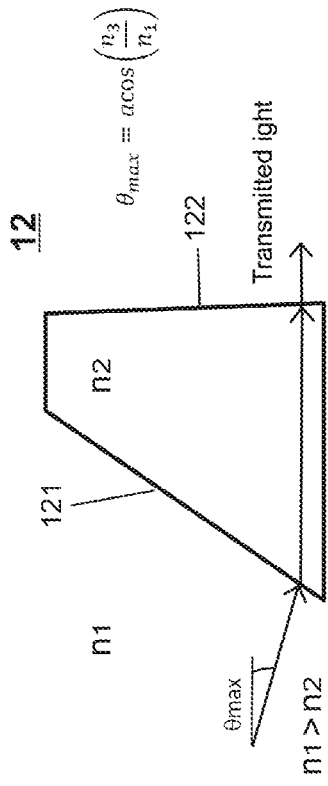
Figure 3H:
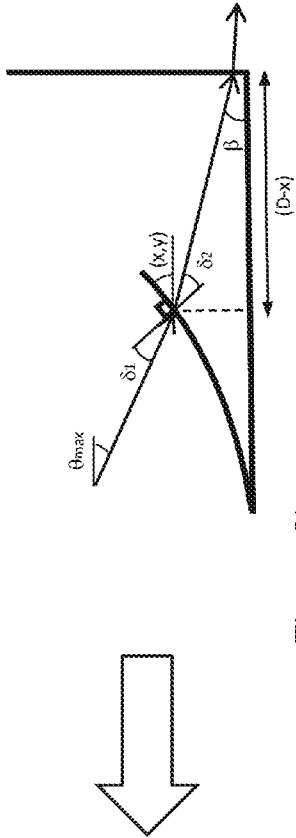
Figure 3E:
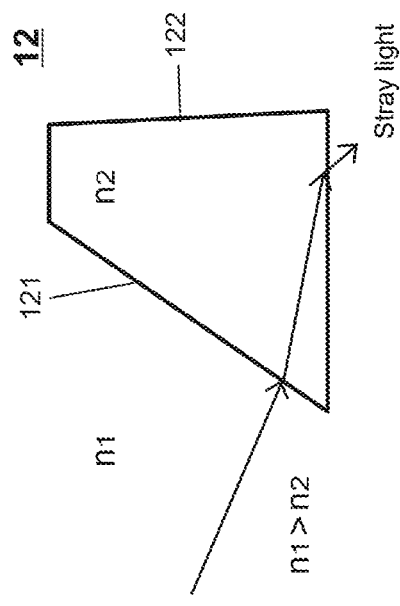
Figure 3G:
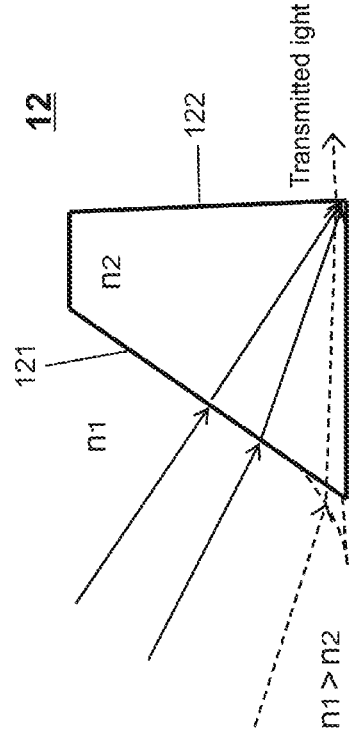
Figure 3J:
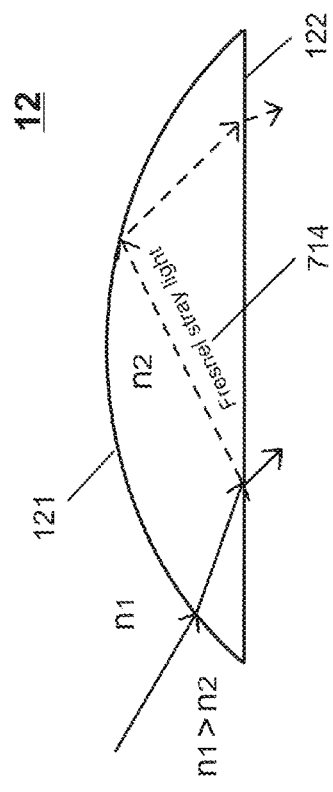
Figure 3L:
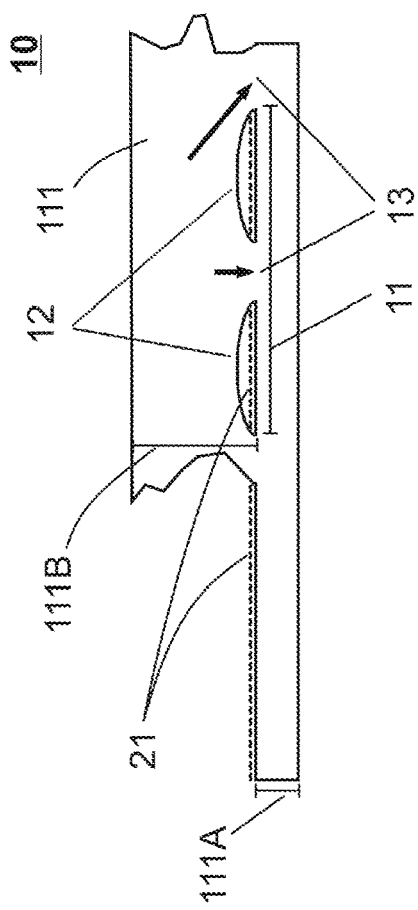
FIG. 3l shows an exemplary configuration of an optically functional layer with a number of optical features embodied as in FIGS. 3i-3k.
Figure 3I:
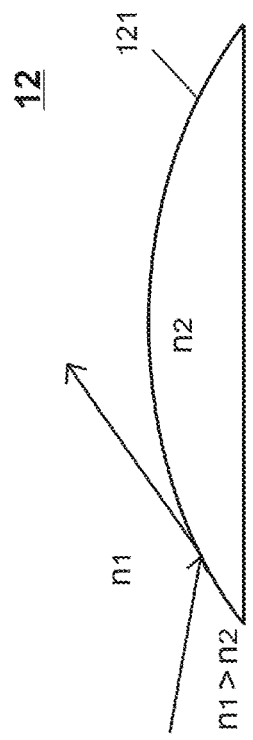

FIGS. 3*a* and 3*i* illustrate a configuration, according to an embodiment, in which light incident on the first (entrance) surface 121 is outcoupled (extracted) via a total internal reflection (TIR) or refraction. Light is not transmitted inside the cavity, whereby stray light and Fresnel reflection can be avoided or at least minimized. Typically, this type of sole light management and arrangement requires a special light source with narrowed light distribution or light incoupling collimation in at least a vertical direction, whereby limiting a range of angles incident at the lightguide element. This solution requires e.g. approximately 10° vertical light collimation in order to achieve TIR function. Special optical arrangement is required for the light incoupling, which can be integrated into the light source or into the lightguide edge. Such arrangement may comprise an optical element and/or redirecting reflector layers on both surfaces of the lightguide in the in-coupling area. Also, an absorption layer can be utilized, wherein all larger incident light angles are eliminated.

FIGS. 3*b* and 3*j* illustrate asymmetric cavity-optics solutions and a basic Fresnel reflection problem encountered thereby. Light is incident at the pattern (cavities 12) at such an angle/angles, at which light, when redirected inside the cavity 12, forms harmful stray light via Fresnel reflections. Fresnel-reflected (stray) light 714 can be further out-coupled from the pattern (dashed line) at a display surface.

FIG. 3*c* shows a symmetric optical cavity solution, in which the first (entrance) surface 121 is configured to incouple incident light arriving thereat and to direct light rays into the cavity towards the second surface 122, and wherein the second surface 122 is configured to receive light rays arriving thereat and to transmit said light rays outside the cavity into the light-transmitting carrier medium 111 for propagation in said medium 11 and/or for outcoupling (out of the layer 10/the device 100 toward an illumination surface). In configuration of FIG. 3*c*, Fresnel reflection caused by the second surface 122 is not outcoupled from the cavity (trapped). Such pattern design minimizes undesired stray light. Additionally, in case a periodic pattern solution is utilized, the second surface 122 configured to transmit and redirect light cooperates with the first surface 121 of a subsequent cavity 12, whereby light extraction/outcoupling efficiency can be improved by optimizing directions of light rays incident onto each (subsequent) cavity.

Figure 3K:
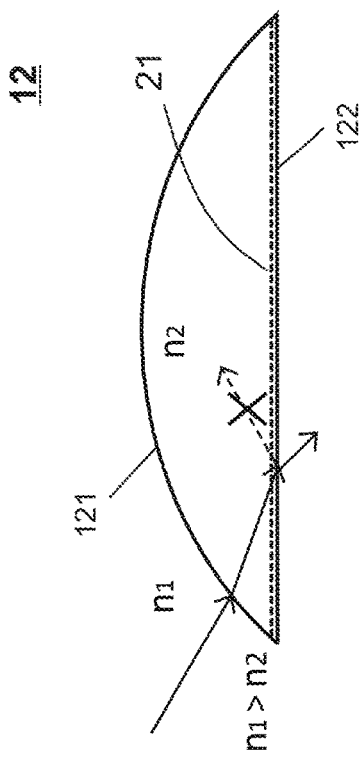

FIGS. 3d and 3k illustrate a configuration, according to an embodiment, for minimizing stray light by eliminating Fresnel reflection via provision of a layer 21 with additional optical functionality, such as an antireflective layer, on the first surface 121 (FIG. 3d) or on the second surface 122 (FIG. 3k), as discussed further below. Avoidance of Fresnel reflection is indicated by a crossed arrow.

FIG. 3e illustrates a cavity-optics solution and a stray light problem encountered thereby. Hence, incident light is received at the first surface 121 and redirected inside the cavity 12, wherefrom light leakage occurs (stray light, FIG. 3e), by refraction at a bottom surface of the cavity, i.e. at an interface between the cavity (n2) and surrounding medium (n1).

In configurations shown on FIGS. 3f and 3g undesired light strays and/or Fresnel reflection can be avoided or at least minimized by providing at least the first surface 121 to incouple light arriving thereto at a predetermined angle or a range of angles.

In configurations shown on FIGS. 3f, 3g, the entrance surface 121 is configured to incouple and to further distribute light arriving thereto at a predetermined angle of incidence or a range of angles of incidence smaller than the critical angle relative to the surface normal, whereby outcoupled Fresnel reflection is avoided.

Critical angle is an incident angle of light relative to the surface normal, at which a phenomenon of the total internal reflection occurs. The angle of incidence becomes a critical angle (i.e. equal to the critical angle), when the angle of refraction constitutes 90 degrees relative to the surface normal. Typically, TIR occurs, when light passes from a medium with high(er) refractive index ($R_i$) to a medium with low(er) for example, from plastic ($R_i$ 1.4-1.6) or glass ($R_i$ 1.5) to the air ($R_i$ 1) or to any other media with essentially low refractive indices. For a light ray travelling from the high $R_i$ medium to the low $R_i$ medium, if the angle of incidence (at a glass-air interface, for example) is greater than the critical angle, then the medium boundary acts as a very good mirror and light will be reflected (back to the high $R_i$ medium, such as glass). When TIR occurs, there is no transmission of energy through the boundary. From the other hand, light incident at angle(s) less than the critical angle, will be partly refracted out of the high $R_i$ medium and partly reflected. The reflected vs refracted light ratio largely depends on the angles of incidence and the refraction indices of the media.

Critical angle is calculated in accordance with equation (1):

$$\theta_e = \theta_i = \arcsin\left(\frac{n_2}{n_1}\right) \quad (1)$$

It should be noted that critical angle varies with a substrate-air interface (e.g. plastic-air, glass-air, etc.). For example, for most plastics and glass critical angle constitutes about 42 degree. Thus, in an exemplary waveguide, light incident at a boundary between a light-transmitting medium, such as a PMMA sheet, and air at an angle of 45 degree (relative to the surface normal), will be probably reflected back to the lightguide medium, thereby, no light out-coupling will occur.

FIG. 3f thus illustrates a solution enabling transmission of light through the optical pattern (the cavities 12), wherein light stray is avoided or at least minimized by limiting an angle of incidence ($\theta_{max}$) at the first surface 121. This requires a solution, wherein the first surface of the cavity profile is configured to limit a range of incident angles to values below the critical angle relative to the surface normal for avoidance of leaked stray light through the bottom interface. Angles of incidence can be limited by provision of an optical collimation element, a redirecting reflector or an absorption layer (not shown) at the surface 121 (light incoupling edge), wherein vertical light distribution is required to be in the range of approximately (±) 15°.

Based on incoupling light distribution parameters the first surface 121 of the cavity can be constructed/designed to enable proper (further) outcoupling and transmission of light through the optical pattern, whereby stray light is minimized by limited angle of incident ($\theta_{max}$).

Figure 17:
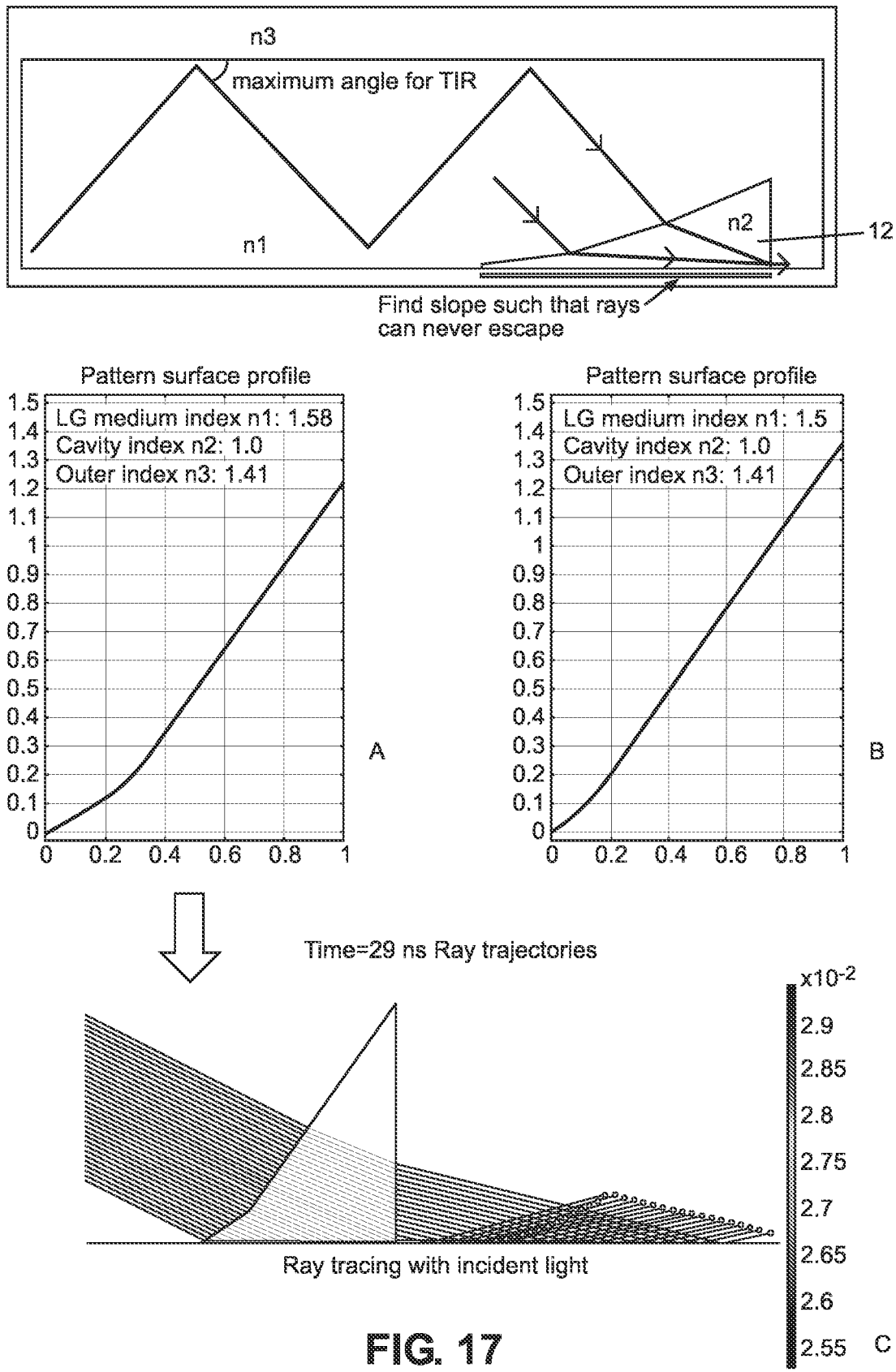
FIG. 17 illustrates a principal design method for an optical cavity pattern surface profile.

The angle of incidence $\theta_{max}$ is determined according to equation (2):

$$\theta_{max} = \mathrm{acos}\left(\frac{n_3}{n_1}\right) \quad (2)$$

wherein n3 is the refractive index ($R_i$) of an external medium outside the lightguide (viz. outside the light-transmitting carrier 111; see FIG. 17, A).

In case of less collimated incoupled light, the first surface 121 has to be modified in order to incouple incident light and to redirect thus incoupled light to a predetermined, single focus point at the opposite wall 122, preferably close to the bottom surface (interface), whereby stray light can be avoided.

In configuration shown on FIG. 3g, the entrance surface 121 is further configured to incouple light arriving thereto with a collimation function and to direct light rays into the cavity such that light propagates through the cavity while avoiding hitting any other surface except the exit surface 122.

FIG. 3g further illustrates a solution enabling transmission of light through the optical pattern (the cavities 12), by modifying an at least first surface profile (shown by a dashed triangle further enlarged at FIG. 3h). The solution allows for avoiding or at least minimizing light stray by modifying a refraction angle of incident light (dashed line).

The optimized part of the pattern surface profile 12 can be defined by an advanced equation (3), according to what the pattern feature profile 12 is modified in order to refract light for transmission through a backwall 122 in an absence of stray light is shown herein below:

$$y = \int_0^x \tan(\alpha(x))dx \quad (3)$$

$$\beta = a\tan\left(\frac{y}{D-x}\right)$$

$$\delta_1 = \frac{\pi}{2} - \theta_{max} - \alpha(x)$$

$$\delta_2 = \frac{\pi}{2} - \alpha(x) - \beta$$

-continued $$n_3\cos\alpha - \sqrt{n_1^2 - n_3^2}\sin\alpha = n_2\cos\alpha\frac{D-x}{\sqrt{y^2 + (D-x)^2}} - n^2\sin\alpha\frac{y}{\sqrt{y^2 + (D-x)^2}}$$

wherein n3 is the refractive index (Ri) of an external medium outside the lightguide (viz. outside the light-transmitting carrier 111), and α is the variable angle as a function of the surface profile.

In solution shown on FIG. 3g, the first surface 121 is configured such as to incouple and to (pre)collimate light arriving thereto, whereby incoupled, (pre)collimated light distribution is established inside the cavity, in which light is further directed towards the second (exit) surface (the bottom surface is not hit).

In other words, FIGS. 3f, 3g illustrate a solution, in which light propagating in the cavity 12 does not hit the bottom surface of said cavity, whereby the stray light problem (FIG. 3e) is avoided.

A reference is made to FIG. 3l that shows the optically functional layer 10. In some configurations, the layer structure 10 further comprises an antireflective layer 21 disposed at the interface between the sublayers 111A, 111B formed by the light-transmitting carrier medium 111. In the embedded feature pattern 11, a plurality of embedded (internal) cavity features 12 thus alternate with a plurality of related light passages 13. Said light passages 13 are light-transmitting carrier medium material 111.

By such an arrangement, a cavity comprising the antireflective layer 21 at its exit surface can be formed (FIG. 3k).

In embodiments, the cavities can be provided with the antireflective layer 21 at the first (entrance) and/or the second- (exit) surfaces thereof. The antireflective layer 21 can be configured as a coating or a structure, preferably, as a broadband anti-reflection (AR) by an AR pattern or a multi-layer coating or a low refractive index ($R_i$)-coating, in order to minimize e.g. Fresnel reflection (FIG. 3d, 3k). The cavity pattern combined with the AR structure (coating), forms a hybrid structure with a multiple optical function.

In embodiments, the cavities 12 in the at least one feature pattern 11 thus comprise the antireflective layer 21 disposed at the entrance surface 121 within an interior of the cavity (FIG. 3d). In embodiments, the cavities further comprise said antireflective layer 21 disposed at the exit surface 122 within an interior of the cavity (FIG. 3k, 3l).

FIG. 3l thus concerns the configuration that employs the AR coating or the AR pattern layer on the flat bottom surface (the second surface 122), which is the surface of the flat sublayer 111A bonded together, by lamination, for example, to the cavity pattern sublayer 111B. By such an arrangement, the AR layer 21 is established solely inside the cavity 12 (at its' bottom surface). During mentioned two-layer bonding, optical interface (provided by the light passages 13) is interrupted at the cavities 12. Accordingly, the AR function is terminated at the light passages 13 (between the air-cavity optics).

The embedded optically functional cavity features 12 can bear various configurations. Thus, the features 12 are selected from the group consisting of: a groove, a recess, a dot, and a pixel. Said cavity features 12 can have crosswise profiles selected from: binary-, blazed-, slanted-, prism-, trapezoid-, hemispherical profiles, and the like, and, further, the cavity features can have lengthwise shape selected from: linear, curved, waved, sinusoid, and the like.

In some embodiments, the optically functional layer 10 can be further configured to comprise the optical cavities 12 established with the three-dimensional profiles selected from one of the essentially blazed, curved or wave-shaped profiles. In some instances it is preferred that the optical cavities 12 are established with the three-dimensional profiles provided as symmetrical sinusoidal waveforms or asymmetrical sinusoidal waveforms.

Overall, the at least one optical feature pattern 11 can be established by the optical features selected from the group consisting of: a groove, a recess, a dot, and a pixel, wherein said features have crosswise concave or convex profiles selected from: binary, blazed, slanted, prism, trapezoid, hemispherical, microlens and the like, and wherein said structures have lengthwise shape selected from: linear, curved, waved, sinusoid, and the like. Said at least one optical feature pattern 11 can be configured as: a periodical grating structure, micro- and nano-optical profiles, discrete patterns, grating pixel pattern (local periodic), and the like. Pattern period can vary from 0.1 micrometers (μm) up to several centimeters (cm) depending on the application. The optical pattern can further include flat areas for bonding or lamination of additional layers and for cavity formation. Length of the individual (feature) profile within the optical pattern can range from a dot/a pixel up to infinity. In fact, a discrete optical pattern profile can be implemented in any three-dimensional format, in view of specific design and/or provision of the most preferred optical functionality.

The smallest pattern features (cavities) 12 can be further optimized and minimized. In particular, the sharp tips can be optimized and minimized by cutting off, rounding or flattening, in order to minimize particular scattering. Such an arrangement solves a problem common for conventional solutions, wherein the optical pattern profiles may cause scattering of diffraction distortion, known as a rainbow effect, which is some cause undesired performance.

Figure 15:
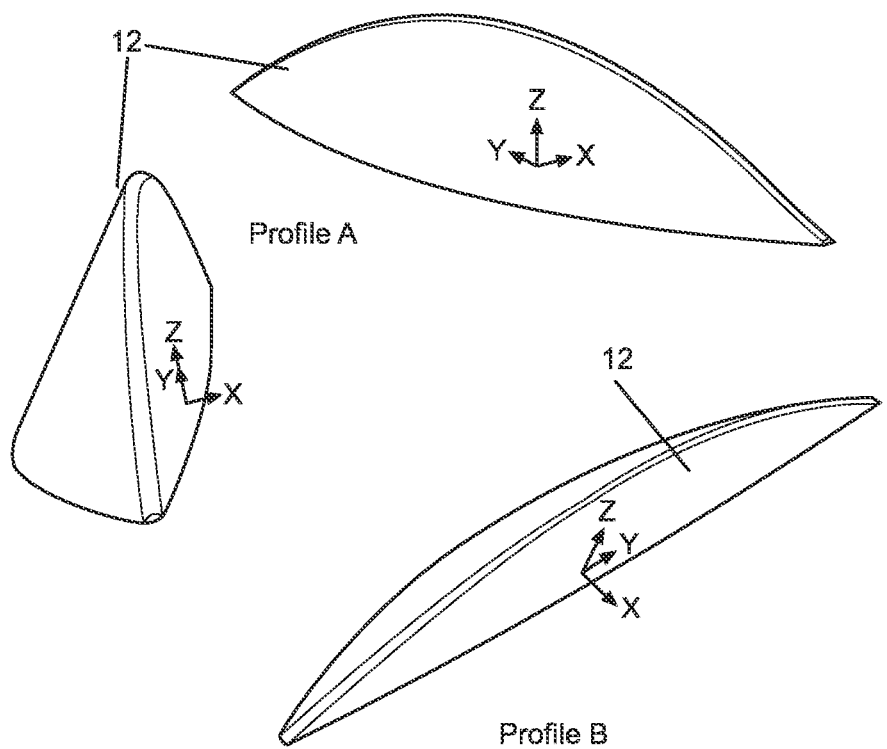
FIGS. 15 and 16 show exemplary configurations for the optically functional feature profiles provided within the feature pattern.
Figure 16:
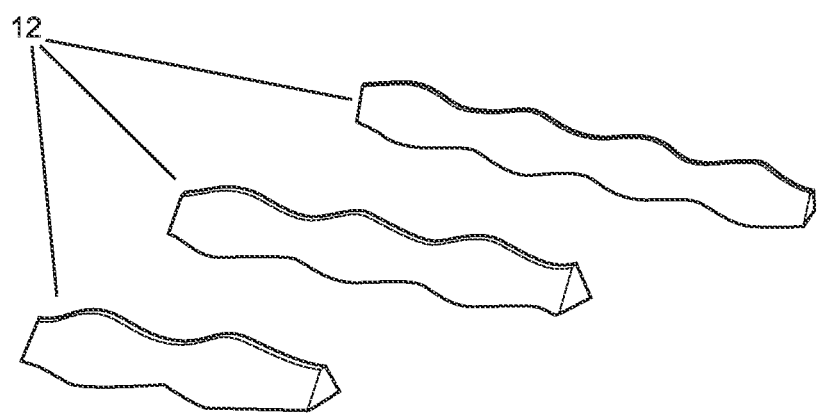

Exemplary pattern solutions for transparent illumination are further presented on FIGS. 15 and 16.

In some instance, the optical cavity pattern solution can be provided with comprising relatively small pattern features (not exceeding 25 μm), which cannot be captured by human eye. Whether larger features are utilized, it is preferred that AR-coatings or AR-patterns are further provided on the profile surfaces (hybrid pattern; FIGS. 3d, 3k, 3l), which makes the pattern less visible to human eye. It is preferred that cavity surface quality is of optical grade, whereby scattering can be effectively avoided, and so stray light.

Basic optical profile in the optically functional layer 10 can be a conventional surface relief pattern or a cavity optics pattern. The latter solution may include gas, fluid or solid material in the optical cavity, most preferable air, which forms TIR effect on the optic surface. Different profiles can be utilized, such as binary, slanted, blazed, prism, micro lens, which are based on diffractive grating or refractive optics. Light angular extraction can be designed for narrow, wide, elliptic, symmetric, asymmetric, etc. distribution.

FIG. 15 thus shows the exemplary pattern features 12 for transparent illumination, in particular, for "invisible" (to human eye) pattern size. Pattern properties are provided in the table 1 hereinbelow.

TABLE 1

Pattern properties for exemplary profiles A and B (FIG. 15).

| Property | Exemplary profile A | Exemplary profile B |
| --- | --- | --- |
| Pattern height | 5 μm | 2.5 μm |
| Pattern length | 43 μm | 21.5 μm |
| Front face angle | 54° | 54° |
| Back face angle | 85° | 85° |
| Tip radius | 0.5 μm | 0.5 μm |
| In/out feed angle | 26° | 26° |

The profiles can be fabricated by fast tool servo (FTS) machining, for example. Above indicated profile parameters are adjustable to achieve desired performance. Additionally adjustable parameters include profile orientation, provision of a single pattern or a periodic pattern, provisions of discrete (pixel) pattern or continuous pattern, etc.

The optical feature pattern 11 comprising the above described cavity profiles can be generally referred to as a "hybrid" pattern that comprises a plurality of discrete feature profiles and/or a plurality of at least partly continuous feature profiles. Said hybrid pattern can thus be configured as a discrete pattern (e.g. a pixel) or as a continuous pattern. Accordingly, said hybrid pattern can be configured to comprise a plurality of optical features 12 provided as discrete profiles or at least partly continuous profiles.

In some embodiments, the optically functional layer 10 can be further configured such, that within the at least one optical feature pattern, the plurality of optical cavities 12 is arranged into an array or arrays extending along and/or across an entire area occupied by said feature pattern (not shown).

In an embodiment, the transparent optical device 100 further comprises an at least one optical filter layer 41, 42 (a light filter layer) disposed on at least one surface of the lightguide medium 101 and provided with at least one optical function through its entire surface coverage or at predetermined areas thereof. Mentioned optical function is selected from at least: reflection, transmission, polarization, and refraction. In some embodiments, the optical filter layer 41, 42 is disposed on both surfaces of the lightguide medium 101.

The light filter layer 41, 42 is preferably configured as a thin film with a layer (film) thickness (h>λ) within a range of 0.2-50 micrometers (μm). In some particular embodiments, layer thickness can vary within a range of 0.2-50 micrometers (μm), preferably, within a range of 0.2-10 μm.

The light filter layer 41, 42 is composed of the substrate material provided as a so called low refractive index material and having the refractive index within a range of 1.10-1.41. In any event the refractive index of the light filter layer is provided below 1.5; preferably, below 1.4.

In some configurations, the light filter layer contains nano-silica material in a mesoporous film. In such an event, the low $R_i$ cladding interphase is coated, laminated or bonded with a low-(out)gassing material in order to sustain an index value.

In some embodiments, the light filter layer 41, 42 is configured as a total internal reflection layer structure. The filter layer 141 can thus be implemented as a reflective TIR solution, based on available TIR materials, such as $TiO_2$, $BaSO_4$, $SiO_2$, $Al_2O_2$, Al, Ag, dielectric materials and high reflection (HR)-coating materials.

In some embodiments, the light filter layer 41, 42 is formed of a substrate material (second medium, n2, FIG. 4a) having the refractive index ($R_i$) lower than the refractive index of the material constituting the optically functional layer 10, 111 and/or the optically transparent (lightguide) substrate 101 (first medium, n1, FIG. 4a), whereby n1>n2 (FIG. 4a). Relationship between the refractive index ($R_i$) value of the light filter layer and the lightguide-related parameters, such as an average brightness (Nits) and extraction efficiency (%) is shown in Table 2 below. The expression "low $R_i$ layer" refers to the light filter layer 41, 42.

TABLE 2

Relationship between the refractive index ($R_i$) value of the light filteri layer and lightguide-related parameters.

| RI value of low Ri layer | Average brightness/Nits | Extraction efficiency, out/in/% |
| --- | --- | --- |
| 1.15 | 10950 | 85.2 |
| 1.20 | 10700 | 84.9 |
| 1.38 | 6900 | 71.9 |
| 1.41 | 5840 | 65.6 |

In an embodiment, the optical filter layer is a cladding, a coating or a film.

Figure 4C:
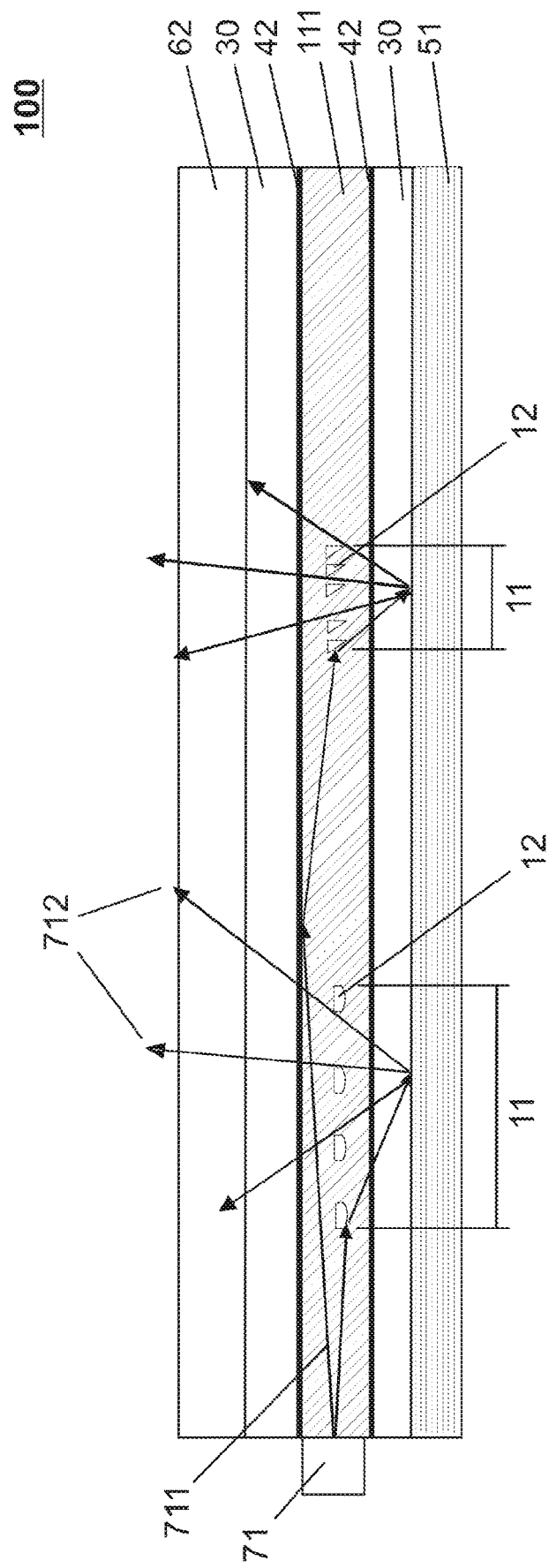

The optical filter layer can be configured as a continuous, uniform layer 42. Alternatively, the optical filter layer (41) can comprise a plurality of optical apertures 41A to enable light transmission therethrough, said apertures being arranged within a predetermined location at said optical filter layer or extending along and/or across an entire surface of said optical filter layer (FIGS. 4a-4c).

The optical apertures 41A are configured adjustable in terms of their dimensions, size and/or shape thereof. In some configurations, the apertures can be essentially circular or rectangular, with the size in either format provided in a range of 0.5-50 μm, preferably, within a range of 1-30 μm. For the essentially rectangular aperture structures, the aforesaid range is indicative of any one of the length and/or width parameters. For the essentially circular aperture structures, the aforesaid range is indicative of an individual aperture diameter. The depth parameter is defined by the thickness of the light filter layer 41 and it is provided within the range of 0.2-50 μm, as defined hereinabove.

Nevertheless, the apertures 41A can be provided as continuous structures, extending over larger areas (in comparison to mentioned above), and having any arbitrary shape. Aperture density and/or the fill factor (per a surface area unit) can be constant (within a range of 0.1%-100%).

It is preferred, that the apertures are established in the light filter layer 41 in a predetermined manner. Thus, in some configurations, provision of apertures is uniform (with constant size, shape and periodicity) along an entire length of a light distribution element, such as a lightguide, i.e. from a light source (e.g. LED) end to the opposite end. In alternative configurations, the apertures can be provided variable in terms of at least size, shape or periodicity from the LED end to the opposite end. Thus, the apertures can be arranged with a variable density utilizing gradual fill factor. In particular, the light distribution element can be configured to include the light filter layer 141 with the apertures, whose size gradually increases from said LED end to the opposite side.

While the optically functional layer with the pattern 11 is primarily configured to propagate and (out)couple light incident thereto, the light filter layer is configured to selectively control and filter light incident thereto and/or propagating via the lightguide.

However, in terms of dimensions, size and/or shape thereof, functionality of the light filter layer 41 can be modified. Thus, the apertures 41A can be further configured, individually or collectively, to perform a variety of functions, such as light transmission, scattering, refraction, reflection, and the like. In some instances, the aperture(s) can be configured to provide the light outcoupling function.

The optical filter can further include apertures with varying optical functionalities, including, but not limited to optical refractive index, non-reflective material, higher optical density, different optical contrast, etc., which provide for light transmitting therethrough and form as a light channel, and have light- and wave-controlling and/or filtering properties to achieve a predetermined light-/signal figure, distribution and efficiency for illumination purposes.

The apertures in the light filter layer can be further filled with a fill material having the refractive index same or higher, as compared to the refractive index of the material the optically transparent (lightguide) substrate 101 is made from.

Reference is made to FIGS. 4a and 4b shows an optical device, embodied at 100A, as an optical pattern-free lightguide element.

The transparent optical device 100A, as shown on FIG. 4a, 4b, thus comprises the lightguide medium 101 configured for light propagation, the optical filter layer 41, 42 disposed on an at least one surface of the lightguide medium and provided with an at least one optical function established through its entire surface coverage or at predetermined areas thereof by at least the material said optical filter layer is made of. Said optical filter layer is a continuous layer formed of a material having a refractive index lower than the refractive index of the material constituting the lightguide medium. The optical filter layer 41, 42 is configured to minimize scattering of light rays propagating through the transparent optical device by the at least one optical function selected from: reflection, transmission, polarization, and refraction.

FIG. 4a thus illustrates a lightguide concept without optical pattern(s) 11. The frontlight solution shown on FIG. 4a comprises the lightguide medium 101 laminated between optical filter layers 41, 42. FIG. 4a shows an example, wherein the lower optical filter layer 41 comprises optical apertures 41A, whereas the upper optical filter layer 42 is configured as the uniform layer without apertures. The lightguide 101 can be made of plastic (PMMA, PC) or glass. The stack is disposed on an illumination surface 51 (a paper like display or a printed poster, for example), and can be further covered with a cover 62 (hereby, a top cover made of plastic or glass, for example), with an adhesive layer 30, such as optically clear adhesive (OCA), for example.

With reference to FIG. 4a, in particular, the enlarged boxes (Option 1, Option 2), light propagates through the apertures 41A, from the lightguide medium 101 (n1, first medium) to an underlying layer 30 (n1, second medium), which has about the same refractive index than the first medium (however, higher or lower $R_i$ values may not be excluded). The refractive index of apertures formed at an interface between the lightguide 101 and, hereby, an underlying layer 30 (FIG. 4a) or an overlaying layer (not shown), typically matches with $R_i$ values of the first- and/or the second medium n1, whereas the Revalue of the optical filter (n2) comprising said apertures, is generally lower than n1.

Option A demonstration manufacturing apertures 41A by a cladding removal method; whereas Option B shows manufacturing apertures 41A by a higher density method.

The light filter layer 41, 42 can be configured as a transparent, low refractive index filter layer or as reflective TIR layer (e.g. diffusive or specular TIR layer) formed on the at least one side of the optically transparent (lightguide) substrate 101 or at or both sides thereof (top and bottom surfaces). Said optical filter can be: a) applied directly on a flat surface, b) laminated by an adhesive layer, or c) bonded by chemical surface treatment such as VUV (vacuum UV), atmospheric plasma treatment or microwave assisted bonding.

In some instances, the light filter layer 41, 42 has gradually variable low $R_i$ values to provide preferred light distribution even in an absence of apertures.

The apertures 41A within the light filter layer 41 can be optically modulated, whereby a variety of light distribution patterns produced by the light filter layer can be attained, including, but not limited to: uniform, symmetric, discrete, or asymmetric light distribution patterns.

The optical filter layer 41 including optical apertures 41A is thus provided on an at least one side of the lightguide medium. The optical filter can thus include apertures with varying optical functionalities, including, but not limited to optical refractive index, non-reflective material, higher optical density, different optical contrast, etc., which provide light passing through it such as a light channel and have light- and wave-controlling and/or filtering properties to achieve a predetermined light-/signal figure, distribution and efficiency for illumination purpose.

Light distribution by the optical apertures forming a predetermined figure/image or signal, for example, such as on a display, a signage or a poster, can be uniform, non-uniform or discrete. Thereby, uniform, non-uniform or discrete image/figure or signal can be formed. Apertures can be provided on both sides of the optical filter layer forming uniform/continuous or discrete areas. The apertures can be provided throughout the entire surface of the optical filter layer or at predetermined areas thereof. The principal function of apertures is to control the amount of incident light propagating from the first medium to the second medium without light out-coupling, meaning all incident light angle is larger or the same as the critical angle in the medium. Especially, light uniformity control can thus be achieved without optical pattern.

Optical apertures have a number of primary functions, such as transmitting light therethrough from the first medium to the second medium, which determines desired light distribution and/or uniformity. Light distribution in the first and second medium typically has an incident light angle below the critical angle (an angle of incidence above which TIR occurs) with regard to the medium interface, when air or low Ri filter/-cladding are forming the interface. As a result, light is not out-coupled from the medium.

FIG. 4b shows the optical device 100A configured as a frontlight solution, in which the lightguide 101 is arranged on the top of the stack (i.e. it is not laminated between layers). Configuration comprises a single optical filter layer 41 configured as a low $R_i$ cladding with apertures. A topmost surface of the lightguide can be further deposited with a hard coating with preferably low $R_i$ value in order to prevent light leakage upon top surface contamination or defect.

FIG. 4c illustrates the optical device 100 solution for frontlight illumination that comprises the optically functional layer 10 configured as the cavity optics lightguide, and uniform optical filter layers (low $R_i$ cladding layers) 42 provided on both sides of the light-transmitting carrier medium 111. Mentioned optical filter layers 42 can be applied onto the medium 111 surface directly or indirectly (viz. by means of adhesive or without adhesive).

Configuration shown on FIG. 4c thus comprises the light filter without apertures and with an optical pattern, such as an outcoupling pattern. The optical pattern 11 is fully integrated inside the lightguide medium 111 and may have different forms or shapes, such as micro-lens, blazed- or slanted forms, discrete pattern or multiple pattern pixel forms, which has periodical and grating features. Lightguide element is laminated, bonded with an adhesive 30, such as optically clear adhesive (OCA) or liquid optically clear adhesive (LOCA), and the like, which has higher $R_i$ than the low $R_i$ cladding 42, preferably the same refractive index than the lightguide medium 111 has. FIG. 4c thus shows a stack solution, in which the optically functional layer 10 provided with the optical filter layers 42 at both sides thereof is further laminated between the display surface 51 (hereby, a reflective display or a poster) and the top cover layer 62 made of plastics or glass.

In configuration shown on FIG. 4c, the optically functional layer 10 comprises cavity features 12 having non-identical shapes. The same configuration having identical shapes can be further provided.

In the optical element 100 configured as shown on FIG. 4c, incident light is coupled by means of the optical cavity pattern(s) 11 into a first medium 111 to achieve a smaller incidence angle than the critical angle (relative to the surface normal), in order to transmit light through the low $R_i$ cladding 42 towards a second medium. Also the second medium may comprise an optical pattern solution (not shown) configured for light outcoupling to form preferred light distribution and illumination. Additionally, the second medium may be void of the optical pattern configured specifically for light directing; thereby, the optical pattern shall outcouple light with preferred angle distribution.

Provision of the optical device comprising the optical filter layer 42 (without apertures) as a lower layer, further topped with the optically functionally layer 10, has benefits that such structure can couple and direct light reflected from the bottom reflector back to the first medium 111, whereby a preferred light distribution is established.

The optical device shown on FIG. 4c thus comprises the lightguide medium 111 for incoupled light propagation together with optical filters 42 for light distribution uniformity control. In the configuration, the cavity pattern is configured such that angle at which light is incident on the pattern is equal to or exceeding the critical angle ($\geq \theta_C$) in the medium. Optical pattern 11 is preferably a uniform pattern with a constant Fill factor, with full filling or with discrete filling. Variable Fill factor may support preferred illumination- or signal indication objective.

Reference is further made to FIG. 9 being illustrative of a fundamental solution aiming at minimizing stray light by Fresnel reflection via provision of an antireflective layer 211 on a light extraction surface (extracted light 712) of the optical device 100, which is not in optical contact with an illumination surface. The AR layer is formed by a single layer or a multilayer coating or by an AR nanostructured layer.

In case of a single element, wherein one top surface is a light extraction surface for single-side ambient illumination, said top surface can be provided with the AR-layer 211 (AR-coating or AR-pattern) on its outer side in order to minimize undesired Fresnel reflection in the opposite direction.

In dual side illumination solutions, provision of the AR layer 211 can be avoided.

In the embodiment, the transparent optical device 100 further comprises the at least one antireflective layer 211 disposed on the optically functional layer 10, whereby the feature pattern 11 is configured to cooperate, in terms of its optical function or functions, with said antireflective layer 211 such as to avoid Fresnel reflection. In some instances, the antireflective layer 211 can comprise a polarizer.

In case of integrated element e.g. with the display, wherein one surface is the light extraction surface for a single side display, lamination having optical contact on the display surface can be provided by optical bonding material in order to minimize undesired Fresnel reflection for opposite direction. FIG. 10 illustrates a fundamental solution aiming at minimizing stray light by Fresnel reflection via provision of an optical contact layer 31 configured to establish an optical bonding with at least a part of the illumination surface 51, such as a display surface.

The optical contact layer is configured to establish the optical contact with the illumination surface or at least a part of by e.g. traditional optical contacting, wherein the surfaces are bonded together without any adhesives or mechanical attachments.

The optical contact layer 31 can be provided for the entire surface 51 or for part of said surface. In some configurations, the optical contact layer 31 is provided as a uniform layer. In some other configurations, the optical contact layer 31 can be further provided with an at least one feature pattern comprising a plurality of optically functional features (e.g. optical patterns, extraction features, etc.). In an event said pattern is not in the contact, it should be applied as close as possible to the illuminated surface 51. It is preferred that said pattern in the optical contact is configured, in terms of dimensions, as small as to remain invisible to human eye.

In some instances, the optical device can further comprise an additional AR layer at every interface, such as between the lightguide 111 and the optical bonding 31 (not shown). This can further minimize Fresnel reflection FIG. 10 thus shows a solution for minimizing Fresnel reflection stray light by optical bonding on the light extraction surface of the lightguide element. Optical bonding forms optical contact with illumination surface, such as display, and it can be utilized in full- or partial area of the illumination surface. Optical contact can be formed by optical patterns, extraction features, as well. Additional AR layer, AR coating or AR-pattern in every interface, e.g. between lightguide and bonding, can minimize the Fresnel reflection.

In embodiments, the optical contact layer 31 is configured to establish a non-permanent optical joint with the illumination surface 51. In another embodiment, the optical contact layer 31 is configured to establish permanent connection with the illumination surface 51.

FIG. 11 illustrates the transparent optical device 100 configured as a transparent illumination element for ambient lighting. The device 100 shown on FIG. 11 device comprises the lightguide medium 101, an optical extraction layer 10 laminated at one side of the lightguide medium 101 and the antireflective layer 211 on the outer side.

The optically functional layer 10 comprises an at least one extraction pattern with constant density or gradual density. The layer 10 can be laminated to the lightguide medium 101 by an adhesive layer 30, optionally comprising an optical filter layer (low $R_i$ layer), preferably configured as the optical filter layer 41 with apertures.

Figure 12:
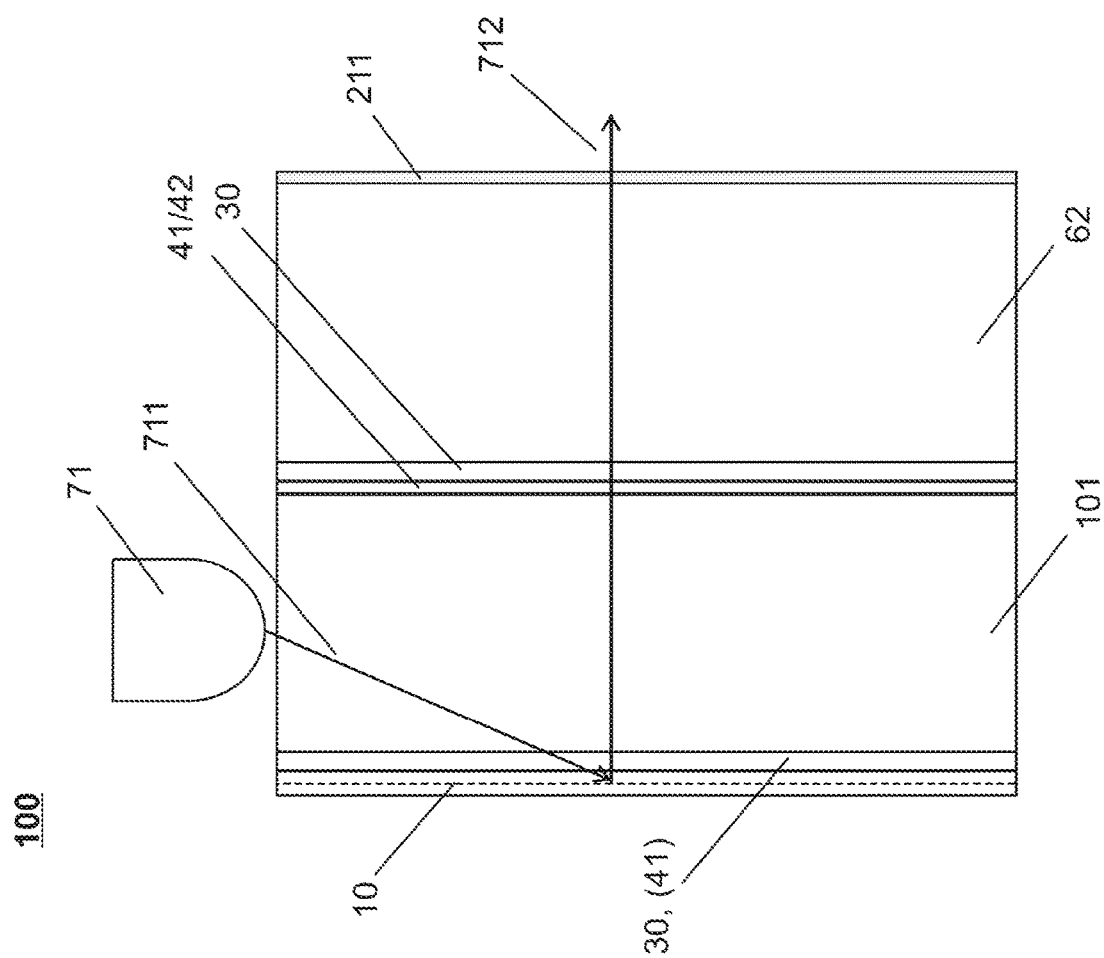
FIGS. 11 and 12 schematically show a stack of the transparent optical device, according to some embodiments.

FIG. 12 illustrates the transparent optical device 100 configured as a transparent illumination element for ambient lighting. The device 100 shown on FIG. 12 comprises the lightguide medium 101, the optical extraction layer 10 laminated to one side of said medium 101 and the cover 62 at the other side of said medium 101. The cover is further provided with the AR layer 211 at an external side (light extraction surface). The lightguide medium can be laminated to the cover 62 by the adhesive layer 30 optimally provided with the optical filter layer 41, 42 (with or without apertures).

FIG. 13 illustrates the transparent optical device 100 for display lighting. The stack includes a lightguide medium 101 with the optically functional layer 10 for optical extraction at one side of the lightguide 101 and the optical filter layer with or without apertures 41, 42 at another side of the lightguide. In some configurations, the stack can include the optical filter layer configured as the low $R_i$ cladding, preferably, the cladding with apertures (layer 41), also between the optically functional layer 10 and the lightguide medium 101, in conjunction with the adhesive layer 30, configured as optically clear adhesive (OCA), for example.

The stack can further comprise the optical contact layer 31 at the illumination side, provided in conjunction with the low $R_i$ cladding layer 41/42. Said optical contact layer 31 is preferably configured as a non-permanent bonding layer formed by elastic, essentially soft optical material.

FIG. 14 illustrates the transparent optical device 100 for display lighting. Configuration generally follows the solution shown on FIG. 13; however, the stack shown on FIG. 14 additionally includes the cover 62, such as a cover glass, laminated with the optically functional layer 10. The solution further comprises the optical filter layer 41, 42 (with or without apertures) provided between the optically functional layer 10 and the cover glass 62. Similarly to FIG. 13, the stack includes the optical contact layer 31 configured as the non-permanent bonding layer formed by elastic, essentially soft optical material.

The optical contact 31 between the lightguide 111, 101 and the illumination surface 51 (display, signage, or poster) can be further provided as a rigid optical material.

It is important that the optical boding 31 contacts the illuminated surface 51, in order to minimize stray light and keep the contrast ratio high. It is preferred that the layer 31 is manufactured form durable material, to attain reliability upon several openings (for non-permanent solutions).

Hence, in embodiments, the transparent optical device 100 comprises the optical filter layer 41, 42 disposed between the lightguide medium 101 and the optically functional layer 10.

In one further aspect, a transparent optical device 100 is provided, comprising a lightguide medium 101 configured for light propagation, an at least one optically functional layer 10 comprising at least one optically functional feature pattern 11 formed in a light-transmitting carrier medium 111 by a plurality of embedded features provided as optically functional internal cavities 12, which at least one feature pattern 11 is configured to perform at least a light outcoupling function, and an optical contact layer 31 configured to establish a non-permanent, re-openable optical joint with an illumination surface 51.

In embodiments, the device 100, 100A further comprises an at least one light source 71, selected from: a Light Emitting Diode (LED), an Organic Light Emitting Diode (OLED), a laser diode, a LED bar, an OLED strip, a microchip LED strip, and a cold cathode tube.

In embodiments, optical transparency of said optical device is established in presence and in absence of illumination derived from said at least one light source 71.

In embodiments, the transparent optical device is configured as a frontlight illumination device or a backlight illumination device. Hybrid illumination with transparent frontlight and backlight can thus be attained, which can be switched for different modes, viz. a transparent mode with transparent directional lightguide on top of the illuminated surface 51/display (illumination away) and a non-transparent mode with light mask with transparent lightguide on the backside of display (illumination towards).

Figure 5:
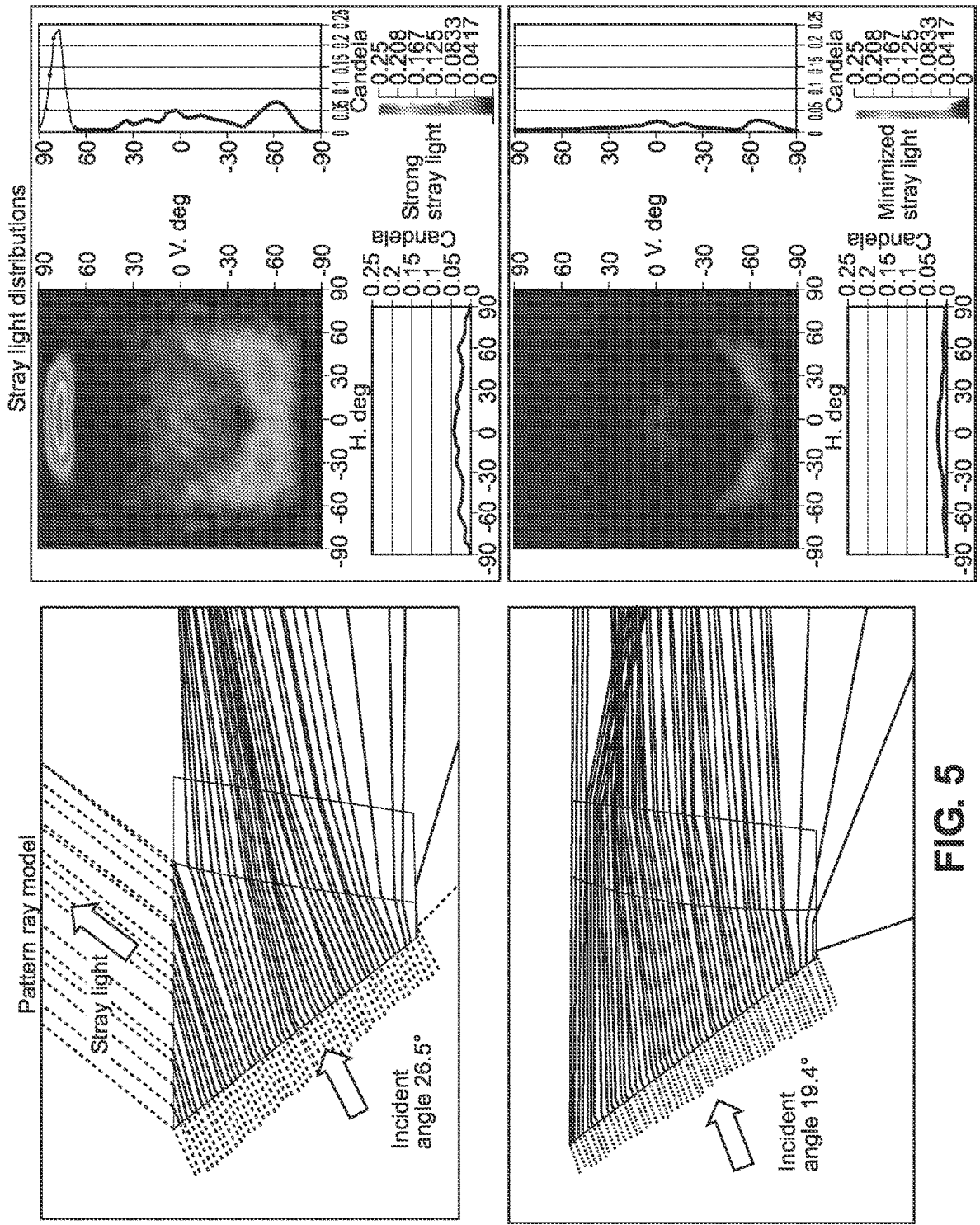
FIGS. 5 and 6 are graphs illustrative of the effect implied by the optical pattern profile design on light extraction and on stray light.

Reference is made to FIG. 5 being illustrative of a fact that pattern profiles and angular control of incident light have an influence on light extraction efficiency and stray light development.

FIG. 5 thus illustrates stray light minimization by a hybrid solution, wherein the first surface 121 of the pattern cavity profile 12 combines light received at limited angles of incidence, smaller than the critical angle relative to the surface normal, whereby light leakage, such as stray light is effectively avoided.

Diagrams on the upper side of FIG. 5 can be illustrative of the solution shown on FIG. 3e, whereas the same on the lower side can be illustrative of the solution shown on FIG. 3f.

Optical cavities 12, in particular, in terms of first surfaces 121 thereof can be designed such as to enable controlling an angle or a range of angle of incident light arriving at said surface. On FIG. 5 one may observe that by narrowing the incident light angle one can markedly reduce change stray light from the flat bottom surface. Compare upper figure showing light incident at an angle 26.5° (strong stray light) with the lower figure showing light incident at an angle 19.4° (minimized stray light) showing a remarkable improvement in terms of minimizing stray light. This is very important design criteria for producing improvements in terms of light extraction and reduction of stray light.

The same improvement can be achieved by cavity profile optimization by equation, especially advanced equation for optimizing the bottom side/or and shape of the cavity profile (FIG. 3g, 3h). The first surface of said cavity profile can be defined by equations 2, 3 presented hereinabove.

Limitation of incident light angle ranges in the lightguide can be achieved and controlled by at least partially collimating incoupled light (at the first surface 121) or by absorbing light arriving at larger angles (compared to the critical angle) of incident light in the incoupling region. The latter is attained by provision of the antireflective layer 21 at the surface 121 (FIG. 3d).

Figure 6:
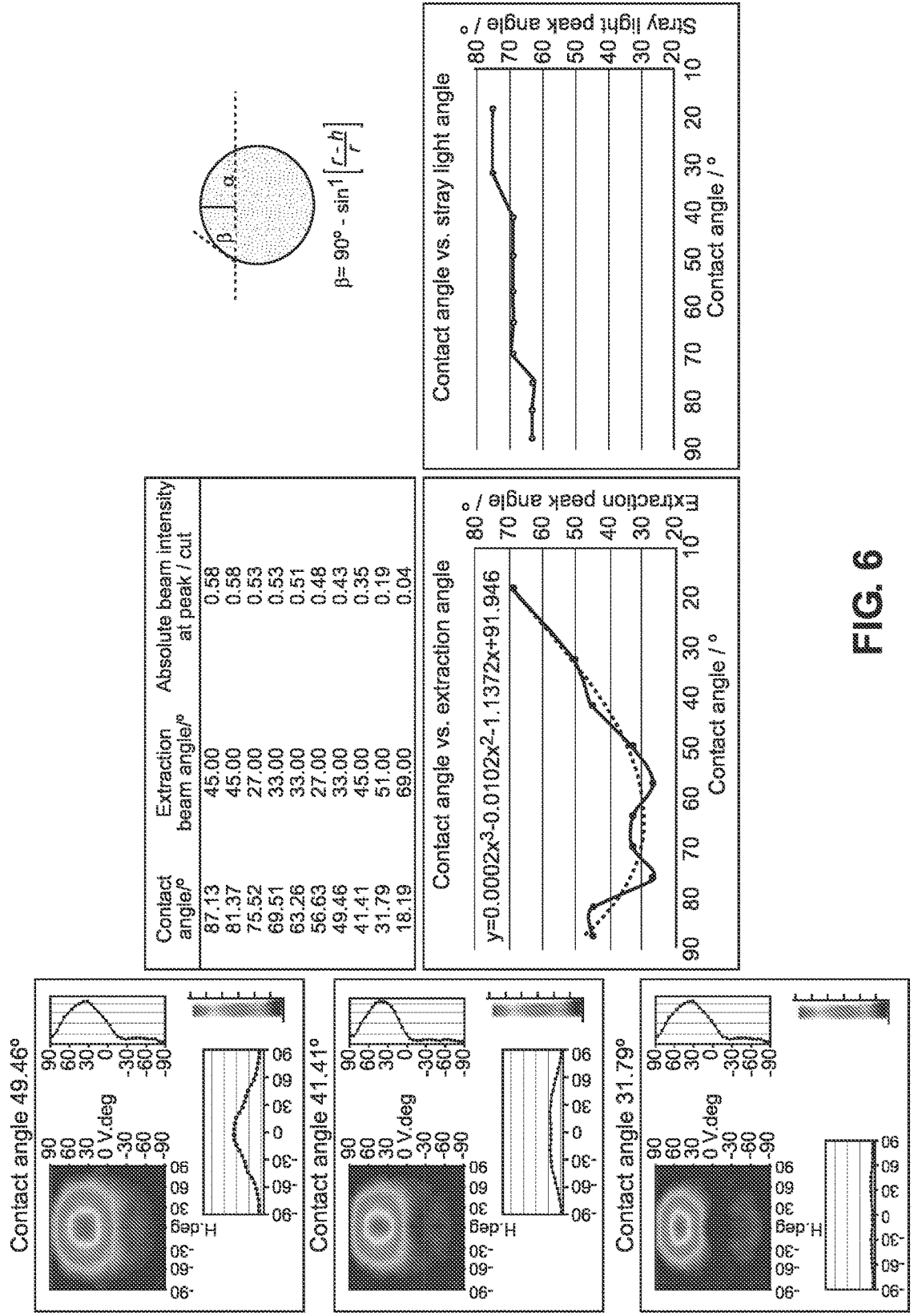

FIG. 6 is illustrative of the fact that design of pattern cavity profiles has an influence on light extraction efficiency and stray light development. FIG. 6 demonstrates relationship between the cavity contact angle (realized as a microlens solution), light extraction efficiency and stray light development as follows: providing the indication of contact angle impact on the light intensity and extraction distribution; illustrating the results of basic simulation for different ML contact angles; and providing charts for light extraction and intensity distribution (without spatial dependency).

The optical cavity profile 12 and, in particular, its first (entrance) surface has to be designed bearing in mind optimized light extraction and stray light ratio. Air-cavity micro-lenses (FIGS. 3i-3l) are beneficial in terms of developing less stray light, possessing higher extraction efficiency and better (extracted light) distribution, in comparison to conventional micro-lens solutions. The contact angle for the ML profile is simulated in terms of extraction angle value, extraction efficiency and stray light level.

FIG. 7 compares the optical device 100 (micro-lens air-cavity design) and a conventional frontlight, in terms of micro-lens light extraction and reduction of stray light.

The optical device 100 is configures as a stack comprising the air-cavity lightguide configured as the optically functional layer 10 with the cavities 12 laminated (top or bottom) to a light absorbing surface 61 by the adhesive 30, preferably, optically clear adhesive (OSA), further comprising the optical filter 41 or 42 (low $R_i$ cladding with or without apertures).

At FIG. 7, a conventional micro-lens frontlight solution is thus compared with the air-cavity micro-lens frontlight solution by analysing both light extraction efficiency with its angular distribution and stray light ratio, wherein bottom and top surfaces have been applied an absorbing layer for each analysis. The solution 100 configured as the air-cavity micro-lens frontlight has over 2.5 times higher light extraction, better distribution angle, over 14 times better stray light ratio compared to the conventional solution.

FIG. 7 is an example demonstrating an impact of the pattern profile on final result. One of the main goals here is avoidance of light penetration inside the pattern profile via critical incident angle, which may cause more stray light by reflection.

Figure 8:
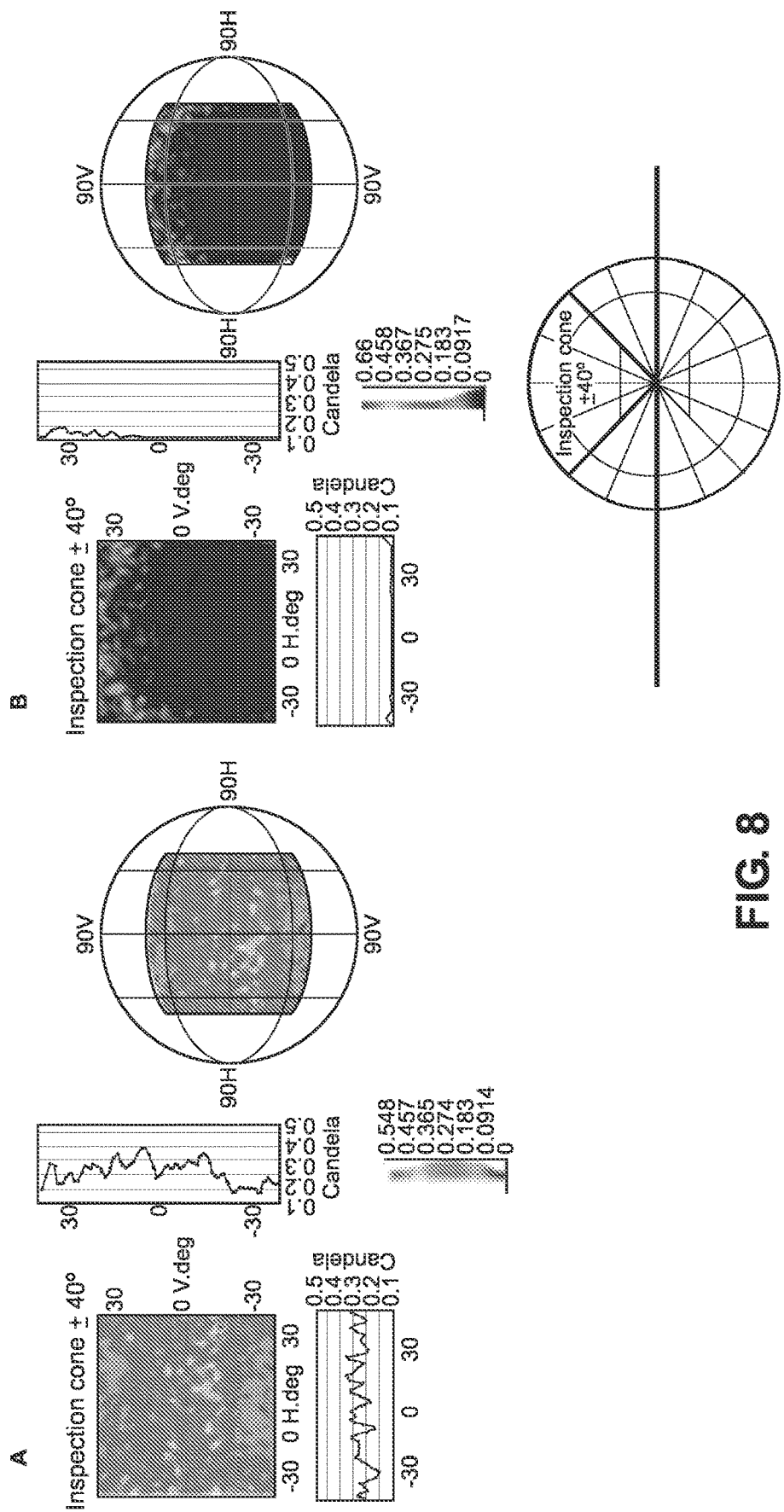
FIG. 8 is illustrative of the effect implied by an antireflective layer arrangement on stray light.

FIG. 8 illustrates that the antireflective (AR) layer 21, 211 has an influence on development of stray light. At A, stray light by Fresnel reflection is shown. At B, improved stray light by minimized Fresnel reflection is shown.

Improvements, in view of minimizing Fresnel stray light, can be provided by pattern design, as well as and internal (21) and external (211) AR-layer arrangements, like at interior surfaces of the cavities (21) or at the bonding interface (211). By the optical device 100, 100A, achievable stray light value can be over 20 times lower than the original.

The optical pattern cavity profiles 12, and their first extraction surface and the second transmitting surface can be designed in combination with the internal AR-layer 21 to achieve improved light extraction and stray light level (FIG. 3d, 3k, 3l).

The AR-layer 21 can be formed by a single layer coating or by multilayer coatings. Also the AR nanostructure can be utilized, in particular, in cavity optics, wherein one slanted surface can provide reasonable demoulding and replication. AR-layer thus works for two directions in the surface. Pattern profile then has hybrid structure, whereby light refraction and anti-reflection can be executed (FIGS. 3d, 3k, 3l).

FIG. 17 further illustrates a design method for pattern surface profiles 12, in particular, for the bottom areas thereof, in terms of light redirecting such as to minimize stray light, light leakage from said bottom surface(s). Calculation(s) are performed according to the advanced equation (3) (shown also on FIG. 3h). Ray tracing model (FIG. 17, C) further depicts light transmission through the opposite surface.

In one further aspect, a transparent illuminated article is provided that comprises the transparent optical device 100, 100A as described herein above. Said transparent illuminated article can be configured as a window, a façade illumination and/or indication element, a roof illumination and/or indication element, a signage, a signboard, a poster, a marketing board, an advertisement board illumination and/or indication element, and an illumination element configured for solar applications.

In still further aspect, use of the optical device 100, 100A is provided in illumination and indication solutions. In particular, use of the device 100, 100A is provided in decorative illumination, in illumination of light shields and masks, in public and general illumination, including window-, façade- and roof illumination-, signage-, signboard-, poster-, marketing board- and/or an advertisement board illumination and indication, and in solar applications.

It is clear to a person skilled in the art that with the advancement of technology the basic ideas of the present invention are intended to cover various modifications thereof. The invention and its embodiments are thus not limited to the examples described above; instead they may generally vary within the scope of the appended claims.

The invention claimed is:

1. A transparent optical device comprising:
   a lightguide medium configured for light propagation; and
   an at least one optically functional layer comprising at least one optically functional feature pattern formed in a light-transmitting carrier medium by a plurality of embedded features provided as optically functional internal cavities,
   wherein the at least one feature pattern is configured to perform an incident light control function and at least a light outcoupling function by establishing a predetermined incoupled light distribution at the at least one feature pattern and/or by modifying refractive indices of materials and elements provided in the optical device and interfaces therebetween, whereby stray light is minimized and optical transparency of the device is established,
   wherein the cavities in the at least one feature pattern comprise an entrance surface and an exit surface, wherein the entrance surface is configured to incouple incident light rays arriving thereat and to direct light rays into a respective one of the cavities towards the exit surface, and wherein the exit surface is configured to receive light rays arriving thereat and to transmit light rays arriving thereat outside the respective one of the cavities into the light-transmitting carrier medium for propagation and/or for outcoupling,
   wherein the entrance surface is further configured to incouple light rays arriving thereto with a collimation function and to direct light rays into the respective one of the cavities such that light rays arriving thereto at a predetermined angle of incidence or a range of angles of incidence propagate through the respective one of the cavities and hit and exit an exit surface while avoiding hitting any other surface including a bottom surface that extends between the entrance surface and the exit surface,
   the entrance surface is further configured to incouple light rays arriving thereto at the predetermined angle of incidence or a range of angles of incidence smaller than a critical angle relative to the surface normal, whereby outcoupled Fresnel reflection is avoided,
   wherein a maximum angle of incidence of the predetermined angle of incidence or the range of angles of incidence is defined by: $\theta_{max}=\mathrm{acos}(n_3/n_1)$,
   the entrance surface includes, at least partially, a curved surface or a non-linear surface such that light rays incident on the entrance surface at the maximum angle of incidence do not hit the bottom surface, and
   wherein $n_3$ is a refractive index of an external medium outside the lightguide and $n_1$ is a refractive index of the light-transmitting carrier medium.

2. The transparent optical device of claim 1, wherein the optical function or functions of the at least one optically functional layer is/are established by an at least one of the: dimensions, shape, periodicity and disposition of the cavities within the at least one feature pattern and by a fill factor value for the at least one feature pattern.

3. The transparent optical device of claim 1, wherein the exit surface is configured to transmit light rays with at least a refraction function.

4. The transparent optical device of claim 1, wherein the cavities in the at least one feature pattern are configured to outcouple incident light rays arriving at the entrance surface, via a total internal reflection (TIR) function.

5. The transparent optical device of claim 1, wherein the cavities in the at least one feature pattern comprise an antireflective layer disposed at the entrance surface within an interior of the respective one of the cavities.

6. The transparent optical device of claim 1, wherein the cavities in the at least one feature pattern further comprise an antireflective layer disposed at the exit surface within an interior of the respective one of the cavities.

7. The transparent optical device of claim 1, wherein the cavities are filled by a gaseous medium.

8. The transparent optical device of claim 1, wherein in the at least one feature pattern the cavities alternate with a plurality of related light passages.

9. The transparent optical device of claim 1, wherein the embedded features are established in the light-transmitting carrier medium by a laminate structure formed by an entirely flat, planar layer of the light-transmitting carrier medium arranged against a patterned layer of the light-transmitting carrier medium, whereby the cavities are formed at an interface between the planar layer and the patterned layer.

10. The transparent optical device of claim 9, further comprising an antireflective layer disposed at the interface between the planar layer and the patterned layer.

11. The transparent optical device of claim 1, wherein the cavities are selected from the group consisting of: a groove, a recess, a dot, and a pixel, wherein the cavities have crosswise profiles selected from: binary-, blazed-, slanted-, prism-, trapezoid-, hemispherical profiles, and the like, and wherein the cavities have lengthwise shape selected from: linear, curved, waved, sinusoid, and the like.

12. The transparent optical device of claim 1, wherein the at least one feature pattern is a hybrid pattern comprising a plurality of discrete feature profiles and/or a plurality of at least partly continuous feature profiles.

13. The transparent optical device of claim 1, wherein the at least one feature pattern is fully integrated and/or embedded within the light-transmitting carrier medium.

14. The transparent optical device of claim 1, further comprising an at least one antireflective layer disposed on the at least one optically functional layer, whereby the at least one feature pattern is configured to cooperate, in terms of its optical function or functions, with the antireflective layer such as to avoid Fresnel reflection.

15. The transparent optical device of claim 14, wherein the antireflective layer comprises a polarizer.

16. The transparent optical device of claim 1, wherein the lightguide medium and the at least one optically functional layer are an optical polymer and/or glass.

17. The transparent optical device of claim 1, further comprising an at least one optical filter layer disposed on an at least one surface of the lightguide medium and provided with an at least one optical function through its entire surface coverage or at predetermined areas thereof, wherein the at least one optical function of the optical filter layer, in terms of at least the material it is formed of, is selected from: reflection, transmission, polarization, and refraction.

18. The transparent optical device of claim 1, wherein the optical filter layer is formed of a substrate material having a refractive index lower than the refractive index of material constituting the optically functional layer.

19. The transparent optical device of claim 1, wherein the optical filter layer is a cladding, a coating, or a film.

20. The transparent optical device of claim 1, wherein the optical filter layer is configured as a reflective Total Internal Reflection layer structure.

21. The transparent optical device of claim 1, wherein the optical filter layer is disposed on both surfaces of the lightguide medium.

22. The transparent optical device of claim 1, wherein the optical filter layer is disposed between the lightguide medium and the optically functional layer.

23. The transparent optical device of claim 1, wherein the optical filter layer comprises a plurality of optical apertures to enable light transmission therethrough, the apertures being arranged within a predetermined location at the optical filter layer or extending along and/or across an entire surface of the optical filter layer.

24. The transparent optical device of claim 1, further comprising an optical contact layer configured to establish an optical bonding with at least a part of an illumination surface.

25. The transparent optical device of claim 1, wherein the optical contact layer is a uniform layer.

26. The transparent optical device of claim 1, wherein the optical contact layer is configured to establish a non-permanent optical joint with the illumination surface.

27. The transparent optical device of claim 1, wherein the optical contact layer is configured to establish a permanent connection with the illumination surface.

28. The transparent optical device of claim 1, further comprising at least one light source, selected from: a Light Emitting Diode (LED), an Organic Light Emitting Diode (OLED), a laser diode, a LED bar, an OLED strip, a microchip LED strip, and a cold cathode tube.

29. The transparent optical device of claim 1, in which optical transparency is established in presence and in absence of illumination derived from at least one light source.

30. The transparent optical device of claim 1, configured as a frontlight illumination device or a backlight illumination device.

31. A transparent optical device for frontlight illumination comprising:
a lightguide medium configured for light propagation,
an at least one optically functional layer comprising at least one optically functional feature pattern formed in a light-transmitting carrier medium by a plurality of embedded features provided as optically functional internal cavities, the at least one feature pattern being configured to perform at least a light outcoupling function, and
an optical contact layer joined to the illumination surface to establish a non-permanent, re-openable optical joint with an illumination surface
wherein the cavities in the at least one feature pattern comprise an entrance surface and an exit surface, wherein the entrance surface is configured to incouple incident light rays arriving thereat and to direct light rays into a respective one of the cavities towards the exit surface, and wherein the exit surface is configured to receive light rays arriving thereat and to transmit light rays arriving thereat outside the respective one of the cavities into the light-transmitting carrier medium for propagation and/or for outcoupling, wherein the entrance surface is further configured to incouple light rays arriving thereto with a collimation function and to direct light rays into the respective one of the cavities such that light rays arriving thereto at a predetermined angle of incidence or a range of angles of incidence propagate through the respective one of the cavities and hit and exit an exit surface while avoiding hitting any other surface including a bottom surface that extends between the entrance surface and the exit surface, the entrance surface is further configured to incouple light rays arriving thereto at the predetermined angle of incidence or a range of angles of incidence smaller than a critical angle relative to the surface normal, whereby outcoupled Fresnel reflection is avoided, wherein a maximum angle of incidence of the predetermined angle of incidence or the range of angles of incidence is defined by: $\theta_{max} = acos(n_3/n_1)$, the entrance surface includes, at least partially, a curved surface or a non-linear surface such that light rays incident on the entrance surface at the maximum angle of incidence do not hit the bottom surface, and wherein $n_3$ is a refractive index of an external medium outside the lightguide and $n_1$ is a refractive index of the light-transmitting carrier medium.

32. A transparent illuminated article comprising the transparent optical device, as defined in claim 1.

33. The transparent illuminated article of claim 32 configured as a window, a facade illumination and/or indication element, a roof illumination and/or indication element, a signage, a signboard, a poster, a marketing board, an advertisement board illumination and/or indication element, and an illumination element configured for solar applications.

34. Use of the transparent optical device as defined in claim 1 in illumination and indication, selected from the group consisting: of decorative illumination, light shields and masks, public and general illumination, including window-, facade- and roof illumination-, signage-, signboard-, poster-, marketing board- and/or an advertisement board illumination and indication, and in solar applications.

35. The transparent optical device of claim 7, wherein the gaseous medium is air.

36. The transparent optical device of claim 18, wherein the optical filter layer is formed of a substrate material having a refractive index lower than the refractive index of material constituting the lightguide medium.

37. The transparent optical device of claim 25, wherein the optical contact layer is provided with an at least one feature pattern comprising a plurality of optically functional features.

38. A transparent optical device comprising:
a lightguide medium configured for light propagation; and
an at least one optically functional layer comprising at least one optically functional feature pattern formed in a light-transmitting carrier medium by a plurality of embedded features provided as optically functional internal cavities, wherein the embedded features are established in the light-transmitting carrier medium by a laminate structure formed by an entirely flat, planar layer of the light-transmitting carrier medium arranged against a patterned layer of the light-transmitting carrier medium, whereby the cavities are formed at an interface between the planar layer and the patterned layer, and an antireflective layer is disposed at the interface between the planar layer and the patterned layer, wherein the at least one feature pattern is configured to perform an incident light control function and at least a light outcoupling function by establishing a predetermined incoupled light distribution at the at least one feature pattern and/or by modifying refractive indices of materials and elements provided in the optical device and interfaces therebetween, whereby stray light is minimized and optical transparency of the device is established, wherein the cavities in the at least one feature pattern comprise an entrance surface and an exit surface, wherein the entrance surface is configured to incouple incident light rays arriving thereat and to direct light rays into a respective one of the cavities towards the exit surface, and wherein the exit surface is configured to receive light rays arriving thereat and to transmit light rays arriving thereat outside the respective one of the cavities into the light-transmitting carrier medium for propagation and/or for outcoupling, wherein the entrance surface is further configured to incouple light rays arriving thereto with a collimation function and to direct light rays into the respective one of the cavities such that light rays arriving thereto at a predetermined angle of incidence or a range of angles of incidence propagate through the respective one of the cavities and hit and exit an exit surface while avoiding hitting any other surface including a bottom surface that extends between the entrance surface and the exit surface, and the entrance surface is further configured to incouple light rays arriving thereto at the predetermined angle of incidence or a range of angles of incidence smaller than a critical angle relative to the surface normal, whereby outcoupled Fresnel reflection is avoided.

* * * * *

UNITED STATES PATENT AND TRADEMARK OFFICE
CERTIFICATE OF CORRECTION

PATENT NO. : 11,733,447 B2
APPLICATION NO. : 16/982293
DATED : August 22, 2023
INVENTOR(S) : Rinko et al.

It is certified that error appears in the above-identified patent and that said Letters Patent is hereby corrected as shown below:

In the Claims

Column 28, Line 55 (Claim 31, Line 11), please change "j oined" to -- joined --.
Column 29, Line 37 (Claim 34, Line 3), please change "consisting: of" to -- consisting of: --.

Signed and Sealed this
Second Day of April, 2024

Katherine Kelly Vidal
*Director of the United States Patent and Trademark Office*